United States Patent
Minami

(10) Patent No.: US 12,533,606 B2
(45) Date of Patent: Jan. 27, 2026

(54) LIQUID CHROMATOGRAPHY COLUMN WITH IMPROVED CONNECTION PERFORMANCE

(71) Applicant: ARKRAY, Inc., Kyoto (JP)

(72) Inventor: Takao Minami, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 278 days.

(21) Appl. No.: 18/359,048

(22) Filed: Jul. 26, 2023

(65) Prior Publication Data

US 2024/0033657 A1    Feb. 1, 2024

(30) Foreign Application Priority Data

Jul. 28, 2022  (JP) ................. 2022-120884

(51) Int. Cl.
  *B01D 15/22* (2006.01)
  *G01N 30/60* (2006.01)
  *G01N 30/02* (2006.01)

(52) U.S. Cl.
  CPC ......... *B01D 15/22* (2013.01); *G01N 30/6004* (2013.01); *G01N 2030/027* (2013.01)

(58) Field of Classification Search
  CPC ........ G01N 30/02; G01N 30/06; G01N 30/88; G01N 2030/027; G01N 30/34; G01N 30/74; G01N 30/32; G01N 2030/025; G01N 30/72; G01N 30/30; G01N 30/96; G01N 30/20; G01N 30/56; G01N 2030/062; G01N 30/90; G01N 30/6004; G01N 30/24;

(Continued)

(56) References Cited

U.S. PATENT DOCUMENTS 4,591,838 A  *  5/1986  Jarvis ..................... G01N 30/82
                                                    141/198
5,037,544 A  *  8/1991  Snyder ............... G01N 30/6047
                                                    96/101

(Continued)

FOREIGN PATENT DOCUMENTS

EP           1875225 A1  *  1/2008
JP        H02-268270 A     11/1990

(Continued)

OTHER PUBLICATIONS

The extended European search report issued by the European Patent Office on Dec. 4, 2023, which corresponds to European Patent Application No. 23188125.1-1001 and is related to U.S. Appl. No. 18/359,048.

*Primary Examiner* — Andre J Allen
(74) *Attorney, Agent, or Firm* — Studebaker Brackett PLLC

(57) ABSTRACT

A liquid chromatography column comprising: a column tube including a flow path that runs therethrough in an axial direction of the column tube and that is filled with a filler; a filter unit that is mounted at an axial direction end of the column tube to trap the filler inside the flow path; and a cap that includes a through hole communicated with the flow path through the filter unit and that is mounted at the column tube, wherein a gap, which is a space into which the filler overflowing from the flow path can escape when the cap is being attached to the column tube, is formed at an outer side of a contact surface at which the column tube and the filter unit contact each other.

5 Claims, 11 Drawing Sheets

(58) Field of Classification Search
CPC ............ G01N 2030/324; G01N 30/60; G01N 30/6095; G01N 30/461; G01N 30/7233; G01N 30/14; G01N 30/16; G01N 30/6026; G01N 30/6017; G01N 33/558; G01N 30/463; G01N 30/6021; G01N 30/38; G01N 30/466; G01N 30/6052; G01N 30/603; G01N 2030/326; G01N 30/6047; G01N 30/6091; G01N 30/8679; G01N 2030/201; G01N 30/8658; G01N 30/36; G01N 2030/202; G01N 30/8675; G01N 2030/884; G01N 30/12; G01N 2030/8831; G01N 30/54; G01N 2030/8813; G01N 30/7266; G01N 30/7206; G01N 30/468; G01N 2030/565; G01N 2030/047; G01N 2030/965; G01N 30/6039; G01N 30/94; G01N 30/64; G01N 30/86; G01N 2030/522; G01N 2030/8804; G01N 30/68; G01N 30/08; G01N 30/50; G01N 30/8631; G01N 30/52; G01N 30/465; G01N 33/6848; G01N 2030/085; G01N 2030/067; G01N 30/84; G01N 2030/045; G01N 30/42; G01N 2030/3007; G01N 2030/562; G01N 30/6069; G01N 30/04; G01N 2030/8881; G01N 30/62; G01N 2030/207; G01N 2030/347; G01N 30/8634; G01N 30/8693; G01N 30/95; G01N 30/78; G01N 30/26; G01N 30/89; G01N 30/82; G01N 30/46; G01N 2030/146; G01N 33/54388; G01N 30/80; G01N 30/6034; G01N 30/22; G01N 30/606; G01N 2030/3084; G01N 30/18; G01N 2030/8809; G01N 2030/889; G01N 2030/528; G01N 2030/328; G01N 30/00; G01N 2030/065; G01N 30/10; G01N 30/92; G01N 33/577; G01N 30/6043; G01N 30/8665; G01N 30/28; G01N 35/1097; G01N 33/6854; G01N 2030/042; G01N 30/8686; G01N 30/6078; G01N 2030/567; G01N 30/8651; G01N 30/40; G01N 2030/8854; G01N 33/533; G01N 30/93; G01N 30/6065; G01N 33/543; G01N 30/58; G01N 2030/121; G01N 2030/8822; G01N 1/405; G01N 21/05; G01N 30/462; G01N 30/8624; G01N 33/531; G01N 33/6803; G01N 30/6082; G01N 30/8668; G01N 2030/524; G01N 2030/009; G01N 33/56983; G01N 30/91; G01N 30/44; G01N 2030/385; G01N 33/68; G01N 21/33; G01N 2030/3046; G01N 2030/3061; G01N 2030/3076; G01N 33/538; G01N 2030/885; G01N 33/54306; G01N 2030/628; G01N 2030/525; G01N 33/54313; G01N 33/54393; G01N 30/66; G01N 2030/623; G01N 33/54353; G01N 2030/626; G01N 2030/8827; G01N 2030/126; G01N 2030/3015; G01N 2030/386; G01N 2030/6013; G01N 2030/402; G01N 30/8696; G01N 2030/8886; G01N 2030/122; G01N 2030/8836; G01N 1/40; G01N 2030/527; G01N 2030/8877; G01N 33/54346; G01N 2030/167; G01N 2030/645; G01N 2030/8872; G01N 2030/746; G01N 30/8617; G01N 2030/342; G01N 2030/3023; G01N 33/54387; G01N 33/582; G01N 2030/383; G01N 33/566; G01N 2030/3053; G01N 33/6851; G01N 2030/8417; G01N 30/8641; G01N 33/532; G01N 2030/127; G01N 1/34; G01N 33/2823; G01N 2030/125; G01N 2030/8411; G01N 2030/3038; G01N 2030/381; G01N 33/28; G01N 2030/008; G01N 2030/387; G01N 27/44747; G01N 27/62; G01N 30/467; G01N 33/6845; G01N 33/53; G01N 33/5308; G01N 33/54373; G01N 2030/128; G01N 2030/625; G01N 33/15; G01N 2030/642; G01N 30/6086; G01N 30/6073; G01N 2021/0346; G01N 2030/285; G01N 21/8483; G01N 30/70; G01N 21/6428; G01N 2560/00; G01N 2030/143; G01N 21/64; G01N 30/8644; G01N 27/66; G01N 35/1095; G01N 1/28; G01N 2030/205; G01N 30/8662; G01N 33/94; G01N 21/78; G01N 2001/2229; G01N 2030/0095; G01N 35/10; G01N 33/587; G01N 2030/322; G01N 1/44; G01N 35/00732; G01N 2030/8494; G01N 2030/945; G01N 2030/204; G01N 30/8682; G01N 2030/303; G01N 30/8637; G01N 33/442; G01N 2030/8435; G01N 21/01; G01N 1/38; G01N 2030/906; G01N 33/02; G01N 2030/847; G01N 33/54366; G01N 33/6842; G01N 27/622; G01N 33/52; G01N 30/8672; G01N 33/545; G01N 33/56911; G01N 1/4055; G01N 27/44721; G01N 33/6893; G01N 2030/208; G01N 2030/8859; G01N 30/8606; G01N 33/58; G01N 33/92; G01N 2030/185; G01N 2030/405; G01N 2030/8429; G01N 21/31; G01N 33/6806; G01N 2030/587; G01N 21/6486; G01N 2030/8818; G01N 2030/521; G01N 2030/6008; G01N 21/6402; G01N 21/65; G01N 27/447; G01N 27/623; G01N 27/64; G01N 27/626; G01N 2030/8868; G01N 21/85; G01N 33/585; G01N 1/2214; G01N 2030/165; G01N 33/44; G01N 33/54386; G01N 35/1004; G01N 35/00623; G01N 33/493; G01N 2440/38; G01N 27/624; G01N 2035/00495; G01N 21/658; G01N 30/7273; G01N 30/8603; G01N 35/0099; G01N 1/14; G01N 2030/388; G01N 30/724; G01N 33/54326; G01N 33/74; G01N 2035/0441; G01N 21/53; G01N 30/8689; G01N 35/1011; G01N 35/1079; G01N 2001/4061; G01N 2030/407; G01N 2035/00524; G01N 33/721; G01N 35/04; G01N 27/22; G01N 33/82; G01N 1/22; G01N 33/00; G01N 33/497; G01N 33/723; G01N 2030/123; G01N 21/4133; G01N 30/7253; G01N 33/743; G01N 2013/006; G01N 2030/8423; G01N 35/028; G01N 2333/11; G01N 2030/8447; G01N 2469/10; G01N
33/5302; G01N 21/645; G01N 33/553;
G01N 2333/165; G01N 2469/20; G01N
33/56916; G01N 33/6809; G01N 33/72;
G01N 21/359; G01N 21/6408; G01N
27/44717; G01N 27/4473; G01N 33/48;
G01N 33/573; G01N 35/00; G01N
2030/8405; G01N 21/3504; G01N
15/0205; G01N 33/2829; G01N 33/588;
G01N 2800/52; G01N 30/728; G01N
35/025; G01N 2030/582; G01N 2400/00;
G01N 30/76; G01N 33/50; G01N 33/80;
G01N 35/00584; G01N 2030/022; G01N
2030/3069; G01N 2030/445; G01N
2030/8845; G01N 33/57484; G01N
2021/6439; G01N 2030/77; G01N 21/84;
G01N 2570/00; G01N 1/4077; G01N
2001/4033; G01N 2030/8441; G01N
21/25; G01N 30/8627; G01N 35/109;
G01N 15/02; G01N 2035/00198; G01N
21/07; G01N 21/47; G01N 33/564; G01N
21/03; G01N 2333/4737; G01N 30/7213;
G01N 33/76; G01N 2333/805; G01N
15/075; G01N 2030/0035; G01N
2030/621; G01N 21/76; G01N 27/18;
G01N 33/2835; G01N 30/7246; G01N
31/12; G01N 33/548; G01N 33/96; G01N
2001/4088; G01N 2030/743; G01N
2035/00435; G01N 24/08; G01N 33/689;
G01N 35/00871; G01N 1/286; G01N
1/4044; G01N 2333/31; G01N 27/30;
G01N 27/44704; G01N 27/44756; G01N
31/22; G01N 33/24; G01N 35/1009;
G01N 2035/00752; G01N 2035/103;
G01N 33/0047; G01N 33/552; G01N
33/56933; G01N 21/3577; G01N
2291/021; G01N 27/226; G01N
27/44743; G01N 30/7293; G01N 30/861;
G01N 33/241; G01N 33/491; G01N
33/544; G01N 33/66; G01N 2035/0484;
G01N 2035/1025; G01N 21/643; G01N
2333/015; G01N 27/26; G01N 27/4045;
G01N 33/56944; G01N 35/1016; G01N
2030/685; G01N 2030/7226; G01N
2035/00326; G01N 21/255; G01N 21/39;
G01N 2201/0221; G01N 27/221; G01N
29/022; G01N 33/287; G01N 35/026;
G01N 1/2273; G01N 2001/2893; G01N
2001/4016; G01N 2035/0091; G01N
21/41; G01N 27/12; G01N 33/5076;
G01N 33/54333; G01N 1/10; G01N
1/2226; G01N 2201/0621; G01N 23/046;
G01N 27/44791; G01N 33/487; G01N
33/569; G01N 33/56938; G01N 33/726;
G01N 35/0092; G01N 35/1065; G01N
2035/00356; G01N 21/73; G01N
2201/0693; G01N 2291/0256; G01N
2291/0426; G01N 30/0005; G01N
33/535; G01N 33/686; G01N 35/085;
G01N 15/06; G01N 2021/3595; G01N
2035/0439; G01N 21/67; G01N
2291/0423; G01N 2458/15; G01N
27/301; G01N 27/44752; G01N
27/44795; G01N 30/722; G01N 33/1826;
G01N 33/542; G01N 33/54391; G01N
33/9493; G01N 35/00009; G01N 1/18;
G01N 2015/0038; G01N 2030/862; G01N
2035/0444; G01N 21/45; G01N 2440/14;
G01N 27/44773; G01N 27/70; G01N
2800/324; G01N 30/7286; G01N
33/5306; G01N 33/56988; G01N 33/78;
G01N 1/02; G01N 11/04; G01N
2001/4027; G01N 2021/0321; G01N
2021/0357; G01N 2035/00554; G01N
2035/00782; G01N 2035/0465; G01N
21/3581; G01N 21/72; G01N 21/86;
G01N 22/00; G01N 23/04; G01N
2333/47; G01N 2440/10; G01N 25/147;
G01N 27/16; G01N 29/0672; G01N
33/22; G01N 33/48735; G01N 33/5008;
G01N 33/60; G01N 11/08; G01N
2001/045; G01N 2021/6482; G01N
2035/0498; G01N 21/0332; G01N
2333/976; G01N 27/4166; G01N
2800/042; G01N 31/16; G01N 33/0062;
G01N 33/182; G01N 33/5695; G01N
33/6896; G01N 35/08; G01N 13/00;
G01N 15/0211; G01N 15/08; G01N
2021/0112; G01N 2035/041; G01N
2035/1053; G01N 21/59; G01N
2201/0627; G01N 27/14; G01N
2800/348; G01N 33/536; G01N 33/9446;
G01N 1/00; G01N 1/24; G01N 1/26;
G01N 2001/383; G01N 2030/3092; G01N
2030/8452; G01N 2030/8476; G01N
2030/903; G01N 2035/00564; G01N
2035/00851; G01N 2035/1037; G01N
21/0303; G01N 21/09; G01N 21/274;
G01N 21/3103; G01N 21/35; G01N
21/631; G01N 25/18; G01N 31/005;
G01N 33/0001; G01N 33/12; G01N
33/225; G01N 33/54389; G01N 33/571;
G01N 33/6857; G01N 2021/335; G01N
2030/647; G01N 2035/00792; G01N
2035/00811; G01N 2035/1032; G01N
2035/1046; G01N 21/6458; G01N
2201/08; G01N 2201/129; G01N
2333/195; G01N 2333/20; G01N
2333/35; G01N 2333/4716; G01N
2496/00; G01N 27/00; G01N 27/06;
G01N 31/00; G01N 33/0004; G01N
33/0027; G01N 33/025; G01N 33/49;
G01N 33/521; G01N 33/559; G01N
33/5764; G01N 33/581; G01N 35/00722;
G01N 35/1002; G01N 1/2202; G01N
2001/4083; G01N 2021/6417; G01N
2021/7759; G01N 2035/00772; G01N
21/82; G01N 2223/419; G01N 2333/08;
G01N 2333/415; G01N 2400/40; G01N
25/04; G01N 2600/00; G01N 33/0009;
G01N 33/0011; G01N 33/0032; G01N
33/0034; G01N 33/2811; G01N 33/2882;
G01N 33/6887; G01N 5/04; G01N
2021/6432; G01N 2021/6467; G01N
2030/162; G01N 2030/8863; G01N
2035/00158; G01N 2035/0491; G01N
2035/1027; G01N 21/77; G01N
2201/061; G01N 2201/062; G01N
2333/162; G01N 2333/38; G01N
2333/59; G01N 27/423; G01N 30/726;

G01N 33/0019; G01N 33/0098; G01N 33/574; G01N 33/57438; G01N 33/6827; G01N 1/4022; G01N 2001/2873; G01N 2021/052; G01N 2021/3181; G01N 2030/8648; G01N 2035/00346; G01N 2035/00514; G01N 2035/00762; G01N 2035/00801; G01N 2201/1242; G01N 2291/0289; G01N 23/2258; G01N 2333/37; G01N 2430/00; G01N 25/14; G01N 2800/04; G01N 2800/085; G01N 2800/50; G01N 31/10; G01N 33/0031; G01N 33/14; G01N 33/4977; G01N 33/6812; G01N 1/4005; G01N 11/00; G01N 2021/7789; G01N 2035/00831; G01N 2035/0415; G01N 2035/0429; G01N 21/00; G01N 21/11; G01N 21/49; G01N 2333/916; G01N 27/041; G01N 2800/7028; G01N 30/8655; G01N 33/184; G01N 33/48707; G01N 33/5002; G01N 33/5085; G01N 33/56961; G01N 33/9406; G01N 35/00712; G01N 1/2813; G01N 1/42; G01N 2001/028; G01N 2021/8488; G01N 2035/00108; G01N 2035/0475; G01N 2035/0477; G01N 2035/106; G01N 21/1702; G01N 21/6456; G01N 2333/005; G01N 2333/075; G01N 2333/4725; G01N 2333/70596; G01N 2400/10; G01N 2496/80; G01N 2500/00; G01N 27/07; G01N 27/44769; G01N 2800/065; G01N 2800/28; G01N 31/168; G01N 33/0014; G01N 33/10; G01N 33/18; G01N 33/523; G01N 33/526; G01N 33/5434; G01N 33/56972; G01N 33/56994; G01N 33/57415; G01N 33/6869; G01N 35/1081; G01N 1/04; G01N 15/01; G01N 15/0625; G01N 15/0826; G01N 2011/0026; G01N 2013/003; G01N 2015/0216; G01N 2015/0687; G01N 2021/1765; G01N 2035/00881; G01N 2035/0093; G01N 2035/0418; G01N 2035/042; G01N 2035/0422; G01N 2035/1051; G01N 21/15; G01N 21/23; G01N 21/27; G01N 21/314; G01N 21/3563; G01N 21/4795; G01N 21/5911; G01N 21/766; G01N 2201/0642; G01N 2201/068; G01N 2333/01; G01N 2333/09; G01N 2333/245; G01N 2333/4712; G01N 2333/4719; G01N 2333/4724; G01N 2333/585; G01N 2333/7051; G01N 2333/70517; G01N 2333/924; G01N 2470/04; G01N 27/02; G01N 27/045; G01N 33/146; G01N 33/188; G01N 33/2805; G01N 33/48714; G01N 33/5304; G01N 33/56966; G01N 33/57407; G01N 33/57449; G01N 33/6818; G01N 33/86; G01N 33/9486; G01N 35/00693; G01N 2021/151; G01N 2021/1787; G01N 2030/765; G01N 2035/00306; G01N 2035/00445; G01N 2035/1058; G01N 2035/1088; G01N 21/031; G01N 21/3586; G01N 21/63; G01N 2333/135; G01N 2333/4709; G01N 2333/575; G01N 2333/918; G01N 2470/10; G01N 2474/00; G01N 25/72; G01N 27/04; G01N 27/08; G01N 27/453; G01N 2800/2821; G01N 2800/60; G01N 33/04; G01N 33/5438; G01N 33/551; G01N 33/57411; G01N 33/57473; G01N 35/0098; G01N 15/1023; G01N 2001/002; G01N 2001/1463; G01N 2001/4011; G01N 2015/1028; G01N 2021/6484; G01N 2021/8887; G01N 2035/00277; G01N 2035/1055; G01N 21/0317; G01N 21/171; G01N 21/43; G01N 21/51; G01N 21/69; G01N 21/8851; G01N 2201/064; G01N 2201/124; G01N 2333/315; G01N 2333/65; G01N 2458/40; G01N 2500/10; G01N 27/185; G01N 27/24; G01N 27/308; G01N 27/44782; G01N 2800/36; G01N 2800/7095; G01N 29/44; G01N 33/5097; G01N 33/537; G01N 33/5436; G01N 33/57469; G01N 33/6815; G01N 33/6824; G01N 5/00; G01N 1/2035; G01N 1/2205; G01N 1/2258; G01N 15/00; G01N 15/0806; G01N 15/082; G01N 2001/022; G01N 2001/1427; G01N 2001/205; G01N 2001/2866; G01N 2001/4066; G01N 2015/0046; G01N 2015/0288; G01N 2015/0846; G01N 2021/414; G01N 2021/5957; G01N 2021/6419; G01N 2021/6463; G01N 2021/6491; G01N 2030/001; G01N 2030/8895; G01N 2035/00237; G01N 2035/009; G01N 2035/0453; G01N 2035/102; G01N 2035/1069; G01N 21/17; G01N 21/251; G01N 21/4738; G01N 21/553; G01N 21/71; G01N 2201/0668; G01N 2223/03; G01N 2333/16; G01N 2333/255; G01N 2333/30; G01N 2333/42; G01N 2333/4731; G01N 2333/475; G01N 2333/61; G01N 2333/76; G01N 2333/79; G01N 24/087; G01N 2500/04; G01N 27/10; G01N 27/228; G01N 27/302; G01N 27/3272; G01N 27/44739; G01N 27/68; G01N 2800/26; G01N 2800/347; G01N 29/02; G01N 29/032; G01N 29/069; G01N 33/0006; G01N 33/0016; G01N 33/0022; G01N 33/03; G01N 33/143; G01N 33/5005; G01N 33/5011; G01N 33/539; G01N 33/57423; G01N 33/57446; G01N 33/5761; G01N 33/6821; G01N 33/84; G01N 33/88; G01N 33/946; G01N 35/1067; G01N 1/30; G01N 11/02; G01N 15/0656; G01N 2001/387; G01N 2021/0367; G01N 2021/1706; G01N 2021/1793; G01N 2021/3129; G01N 2021/6421; G01N 2021/6469; G01N 2021/651; G01N 2021/7786; G01N 2030/0015; G01N 2035/0493; G01N 21/19; G01N 21/21; G01N 21/453; G01N 21/4788; G01N 21/61; G01N 21/75; G01N 21/763; G01N 21/8422; G01N 21/8806; G01N 2201/0639; G01N 2201/1293; G01N 2223/612; G01N 2291/018; G01N 2291/0231; G01N 2291/0232; G01N 2291/02809; G01N 2333/032; G01N

2333/23; G01N 2333/285; G01N
2333/32; G01N 2333/43508; G01N
2333/45; G01N 2333/471; G01N
2333/525; G01N 2333/70539; G01N
2333/765; G01N 2333/78; G01N
2333/986; G01N 2430/10; G01N
2440/00; G01N 2458/20; G01N 25/00;
G01N 25/12; G01N 2500/02; G01N
27/38; G01N 27/403; G01N 27/44765;
G01N 27/74; G01N 27/9006; G01N
2800/067; G01N 2800/12; G01N
2800/24; G01N 2800/30; G01N
2800/368; G01N 2800/56; G01N
29/4454; G01N 33/0013; G01N 33/0036;
G01N 33/0057; G01N 33/26; G01N
33/5014; G01N 33/5038; G01N 33/5091;
G01N 33/525; G01N 33/534; G01N
33/557; G01N 33/561; G01N 33/563;
G01N 33/57419; G01N 33/57476; G01N
33/57488; G01N 33/6866; G01N
33/6884; G01N 33/9453; G01N 33/9466;
G01N 35/00594; G01N 35/02; G01N
7/14; G01N 1/2211; G01N 13/02; G01N
15/1404; G01N 2001/021; G01N
2001/1006; G01N 2001/1031; G01N
2001/2217; G01N 2001/2261; G01N
2001/227; G01N 2001/242; G01N
2001/248; G01N 2001/288; G01N
2015/084; G01N 2021/0106; G01N
2021/115; G01N 2021/1714; G01N
2021/1736; G01N 2021/4146; G01N
2021/458; G01N 2021/4711; G01N
2021/641; G01N 2021/6478; G01N
2021/7753; G01N 2021/7796; G01N
2030/8458; G01N 2035/00386; G01N
2035/1039; G01N 21/474; G01N 21/55;
G01N 21/648; G01N 21/68; G01N
21/718; G01N 21/7703; G01N
2201/0245; G01N 2201/0636; G01N
2201/0691; G01N 2223/1013; G01N
2223/401; G01N 2291/015; G01N
2291/023; G01N 2291/0234; G01N
2291/02827; G01N 2291/02854; G01N
2291/105; G01N 23/223; G01N 2333/03;
G01N 2333/13; G01N 2333/14; G01N
2333/145; G01N 2333/185; G01N
2333/205; G01N 2333/265; G01N
2333/28; G01N 2333/385; G01N
2333/405; G01N 2333/4713; G01N
2333/58; G01N 2333/914; G01N
2333/922; G01N 2400/02; G01N
2405/08; G01N 2440/12; G01N 2440/20;
G01N 27/123; G01N 27/3278; G01N
27/42; G01N 27/44786; G01N 27/49;
G01N 27/82; G01N 27/83; G01N
27/9046; G01N 2800/044; G01N
2800/06; G01N 2800/122; G01N
2800/2857; G01N 2800/2871; G01N
2800/321; G01N 2800/325; G01N
2800/38; G01N 29/024; G01N 29/036;
G01N 29/045; G01N 29/0618; G01N
29/09; G01N 29/4427; G01N 29/4481;
G01N 3/02; G01N 33/0018; G01N
33/0026; G01N 33/0044; G01N 33/007;
G01N 33/0096; G01N 33/1813; G01N
33/1846; G01N 33/2888; G01N 33/34;
G01N 33/445; G01N 33/46; G01N
33/4905; G01N 33/502; G01N 33/528;
G01N 33/547; G01N 33/56977; G01N
33/579; G01N 33/6863; G01N 33/70;
G01N 33/90; G01N 33/9433; G01N
33/9473; G01N 33/948; G01N 35/1072;
G01N 5/02; G01N 7/00; G01N 9/32;
G01N 1/20; G01N 1/32; G01N 15/04;
G01N 15/042; G01N 15/065; G01N
15/10; G01N 15/1456; G01N 15/1459;
G01N 2001/007; G01N 2001/027; G01N
2001/1418; G01N 2001/2057; G01N
2001/2223; G01N 2001/2244; G01N
2001/282; G01N 2001/386; G01N
2015/0011; G01N 2015/0092; G01N
2015/0294; G01N 2015/1493; G01N
2021/0307; G01N 2021/0328; G01N
2021/0382; G01N 2021/054; G01N
2021/152; G01N 2021/1738; G01N
2021/3155; G01N 2021/3159; G01N
2021/3572; G01N 2021/4126; G01N
2021/653; G01N 2021/7793; G01N
2021/8466; G01N 2021/888; G01N
2030/0065; G01N 2030/382; G01N
2035/00148; G01N 2035/00178; G01N
2035/00247; G01N 2035/00376; G01N
2035/00465; G01N 2035/00534; G01N
2035/00544; G01N 2035/00673; G01N
2035/00891; G01N 2035/0405; G01N
2035/0406; G01N 2035/0451; G01N
2035/1018; G01N 21/253; G01N 21/29;
G01N 21/3151; G01N 21/431; G01N
21/552; G01N 21/6404; G01N 21/6447;
G01N 21/66; G01N 21/7746; G01N
21/783; G01N 21/896; G01N 21/94;
G01N 21/95; G01N 2201/0225; G01N
2201/0624; G01N 2201/0633; G01N
2201/0638; G01N 2201/065; G01N
2201/066; G01N 2201/0695; G01N
2201/12; G01N 2201/121; G01N
2201/1296; G01N 2203/0682; G01N
2223/316; G01N 2223/3306; G01N
2291/0215; G01N 2291/024; G01N
2291/02836; G01N 2291/0427; G01N
2291/048; G01N 2291/102; G01N
23/044; G01N 23/207; G01N 2333/085;
G01N 2333/115; G01N 2333/183; G01N
2333/25; G01N 2333/3156; G01N
2333/325; G01N 2333/465; G01N
2333/4746; G01N 2333/54; G01N
2333/595; G01N 2333/605; G01N
2333/62; G01N 2333/705; G01N
2333/7155; G01N 2333/7156; G01N
2333/775; G01N 2333/902; G01N
2333/904; G01N 2333/96413; G01N
2333/974; G01N 2333/978; G01N
2333/98; G01N 2333/99; G01N 24/081;
G01N 24/082; G01N 24/088; G01N
2400/18; G01N 2400/38; G01N 2400/50;
G01N 2405/04; G01N 2410/00; G01N
2446/20; G01N 2446/40; G01N 2470/06;
G01N 25/32; G01N 27/28; G01N
27/3273; G01N 27/404; G01N 27/4074;
G01N 27/4075; G01N 27/416; G01N

27/4175; G01N 27/44708; G01N 27/44726; G01N 27/725; G01N 27/9026; G01N 2800/00; G01N 2800/046; G01N 2800/125; G01N 2800/2828; G01N 2800/32; G01N 2800/42; G01N 29/04; G01N 29/14; G01N 29/222; G01N 29/2418; G01N 29/32; G01N 29/4463; G01N 29/4472; G01N 29/449; G01N 29/46; G01N 31/002; G01N 31/164; G01N 33/005; G01N 33/0054; G01N 33/0095; G01N 33/1806; G01N 33/1833; G01N 33/227; G01N 33/30; G01N 33/42; G01N 33/483; G01N 33/4833; G01N 33/492; G01N 33/4925; G01N 33/5073; G01N 33/5094; G01N 33/5375; G01N 33/555; G01N 33/56922; G01N 33/56927; G01N 33/57434; G01N 33/5767; G01N 33/64; G01N 33/6839; G01N 33/6875; G01N 33/6878; G01N 33/728; G01N 33/9413; G01N 35/1074; G01N 5/045; G01N 7/04; G01N 9/00; G01N 9/24; B01D 15/22; B01D 15/3809; B01D 15/3804; B01D 15/08; B01D 15/363; B01D 15/362; B01D 15/206; B01D 15/20; B01D 15/327; B01D 15/361; B01D 15/14; B01D 15/40; B01D 15/34; B01D 15/10; B01D 15/325; B01D 15/166; B01D 15/3847; B01D 15/426; B01D 15/1871; B01D 15/1864; B01D 15/305; B01D 15/36; B01D 15/203; B01D 15/424; B01D 15/1807; B01D 15/3828; B01D 15/18; B01D 15/3833; B01D 15/1885; B01D 15/1821; B01D 15/1892; B01D 15/163; B01D 15/1878; B01D 15/38; B01D 15/422; B01D 53/025; B01D 15/12; B01D 15/16; B01D 15/1828; B01D 15/24; B01D 15/265; B01D 15/185; B01D 15/247; B01D 15/1842; B01D 15/322; B01D 15/161; B01D 15/165; B01D 69/02; B01D 15/366; B01D 15/42; B01D 15/30; B01D 63/10; B01D 15/1814; B01D 15/367; B01D 11/0203; B01D 15/26; B01D 15/125; B01D 15/32; B01D 15/3885; B01D 63/082; B01D 19/0031; B01D 2325/12; B01D 15/3823; B01D 15/168; B01D 2313/40; B01D 11/0288; B01D 2311/2626; B01D 2315/16; B01D 69/148; B01D 15/00; B01D 59/30; B01D 67/00931; B01D 61/44; B01D 39/14; B01D 15/364; B01D 15/3819; B01D 61/145; B01D 19/00; B01D 15/3857; B01D 71/024; B01D 19/0036; B01D 59/26; B01D 15/3842; B01D 15/3876; B01D 2323/30; B01D 2325/0283; B01D 39/1623; B01D 15/245; B01D 19/0063; B01D 2313/08; B01D 53/0423; B01D 11/04; B01D 2315/10; B01D 39/16; B01D 53/02; B01D 19/0042; B01D 2313/12; B01D 2325/36; B01D 61/027; B01D 19/0005; B01D 2313/14; B01D 69/106; B01D 69/12; B01D 2313/62; B01D 71/0281; B01D 57/02; B01D 11/0492; B01D 2253/202; B01D 63/087; B01D 71/82; B01D 15/1857; B01D 15/428; B01D 67/0093; B01D 71/10; B01D 69/147; B01D 63/024; B01D 63/14; B01D 71/027; B01D 9/0004; B01D 2221/10; B01D 61/48; B01D 15/242; B01D 61/00; B01D 71/36; B01D 2253/102; B01D 63/034; B01D 15/02; B01D 15/365; B01D 2253/106; B01D 2319/04; B01D 71/261; B01D 15/3814; B01D 61/146; B01D 69/1411; B01D 71/26; B01D 71/56; B01D 71/68; B01D 53/0407; B01D 71/262; B01D 2253/308; B01D 2311/2697; B01D 2323/36; B01D 61/18; B01D 69/08; B01D 11/02; B01D 11/0242; B01D 2311/08; B01D 61/58; B01D 69/141; B01D 11/0407; B01D 61/22; B01D 61/422; B01D 11/0403; B01D 61/52; B01D 63/107; B01D 2325/34; B01D 39/08; B01D 69/10; B01D 71/34; B01D 11/028; B01D 19/0073; B01D 2325/14; B01D 2325/16; B01D 29/56; B01D 45/16; B01D 59/00; B01D 59/44; B01D 19/0015; B01D 2323/16; B01D 45/08; B01D 63/02; B01D 63/081; B01D 63/0822; B01D 15/1835; B01D 17/12; B01D 2257/91; B01D 2317/022; B01D 2325/20; B01D 53/04; B01D 63/084; B01D 71/021; B01D 9/0013; B01D 35/02; B01D 67/0006; B01D 9/0009; B01D 2253/31; B01D 2311/04; B01D 2313/042; B01D 61/147; B01D 11/0219; B01D 15/3852; B01D 19/0084; B01D 67/00933; B01D 2313/04; B01D 2313/44; B01D 36/00; B01D 53/0438; B01D 61/02; B01D 61/462; B01D 63/005; B01D 65/003; B01D 67/0088; B01D 69/144; B01D 11/048; B01D 15/1894; B01D 2311/2642; B01D 2325/42; B01D 71/16; B01D 19/0068; B01D 2253/25; B01D 2313/2031; B01D 2317/025; B01D 2317/04; B01D 53/18; B01D 63/00; B01D 71/64; B01D 1/26; B01D 15/3866; B01D 19/0057; B01D 24/008; B01D 24/14; B01D 53/0454; B01D 61/007; B01D 69/125; B01D 71/00; B01D 1/22; B01D 15/3861; B01D 2011/002; B01D 21/262; B01D 2311/16; B01D 2315/08; B01D 2323/12; B01D 2325/04; B01D 11/0284; B01D 17/0217; B01D 2253/306; B01D 2313/105; B01D 2313/125; B01D 2323/58; B01D 3/10; B01D 63/06; B01D 63/066; B01D 11/0292; B01D 19/0021; B01D 2253/104; B01D 2253/311; B01D 2256/24; B01D 2257/504; B01D 2311/2623; B01D 2313/025; B01D 2313/2061; B01D 61/04; B01D 61/14; B01D 61/461; B01D 71/08; B01D 2239/1216; B01D 2325/38; B01D 29/03; B01D 39/1676; B01D 39/1692; B01D 53/30; B01D 67/0002; B01D 11/0415; B01D 11/0488; B01D 2239/065; B01D 2256/22; B01D 2323/02; B01D 2323/38; B01D 29/96; B01D 36/003; B01D 53/047; B01D 11/0426; B01D 21/26; B01D 2252/10; B01D 2256/18; B01D

2257/70; B01D 2257/80; B01D 2259/41; B01D 2325/02; B01D 2325/022; B01D 3/143; B01D 3/42; B01D 36/02; B01D 53/268; B01D 59/28; B01D 61/243; B01D 65/08; B01D 67/0011; B01D 69/06; B01D 69/105; B01D 9/0045; B01D 11/0207; B01D 11/043; B01D 11/0438; B01D 11/0484; B01D 15/1896; B01D 21/0009; B01D 2239/0654; B01D 2256/12; B01D 2257/702; B01D 2311/06; B01D 2321/2008; B01D 2325/0212; B01D 3/34; B01D 35/1435; B01D 39/18; B01D 53/0446; B01D 61/0271; B01D 61/16; B01D 61/362; B01D 67/0009; B01D 69/1214; B01D 71/74; B01D 1/0017; B01D 11/0265; B01D 15/388; B01D 17/0208; B01D 21/02; B01D 2201/16; B01D 2201/54; B01D 2239/0407; B01D 2239/0428; B01D 2256/16; B01D 2311/2649; B01D 2313/02; B01D 2313/10; B01D 2313/20; B01D 2325/50; B01D 29/52; B01D 29/60; B01D 3/06; B01D 3/14; B01D 39/083; B01D 53/0431; B01D 53/1493; B01D 53/228; B01D 61/029; B01D 61/20; B01D 61/38; B01D 61/445; B01D 61/46; B01D 63/0821; B01D 65/00; B01D 67/0016; B01D 69/1216; B01D 71/02231; B01D 71/401; B01D 71/601; B01D 8/00; B01D 1/222; B01D 11/0476; B01D 15/3871; B01D 19/0052; B01D 2239/0414; B01D 2252/205; B01D 2256/10; B01D 2257/11; B01D 2257/7022; B01D 2257/708; B01D 2259/40001; B01D 2259/40005; B01D 2259/40096; B01D 2311/2676; B01D 2311/2699; B01D 2313/19; B01D 2313/23; B01D 2313/54; B01D 2313/58; B01D 2313/90; B01D 2321/28; B01D 2323/18; B01D 2323/21835; B01D 2323/34; B01D 2323/345; B01D 2323/385; B01D 2325/02834; B01D 2325/08; B01D 2325/22; B01D 25/12; B01D 29/01; B01D 29/50; B01D 3/02; B01D 3/346; B01D 3/36; B01D 39/04; B01D 39/06; B01D 39/086; B01D 39/2034; B01D 39/2075; B01D 39/2093; B01D 51/10; B01D 53/06; B01D 53/14; B01D 53/1468; B01D 53/22; B01D 53/265; B01D 59/02; B01D 59/50; B01D 61/025; B01D 61/28; B01D 63/0233; B01D 63/08; B01D 63/089; B01D 67/0013; B01D 67/003; B01D 67/0046; B01D 67/0072; B01D 67/0083; B01D 67/0095; B01D 69/082; B01D 69/0871; B01D 69/108; B01D 69/1218; B01D 71/42; B01D 11/00; B01D 11/0211; B01D 11/0273; B01D 11/0419; B01D 15/102; B01D 15/1801; B01D 17/00; B01D 17/0202; B01D 19/0078; B01D 19/02; B01D 21/01; B01D 21/30; B01D 2201/4046; B01D 2239/0622; B01D 2239/0627; B01D 2239/0668; B01D 2239/0695; B01D 2239/10; B01D 2239/1291; B01D 2253/112; B01D 2253/304; B01D 2253/34; B01D 2256/26; B01D 2257/206; B01D 2257/93; B01D 2258/02; B01D 2258/0216; B01D 2259/124; B01D 2259/402; B01D 2259/4533; B01D 2311/13; B01D 2311/18; B01D 2311/26; B01D 2311/2603; B01D 2313/041; B01D 2313/13; B01D 2313/18; B01D 2313/203; B01D 2313/24; B01D 2313/50; B01D 2313/70; B01D 2321/16; B01D 2321/162; B01D 2321/168; B01D 2323/40; B01D 2325/026; B01D 25/002; B01D 27/00; B01D 29/41; B01D 29/58; B01D 3/00; B01D 3/4211; B01D 33/0158; B01D 33/03; B01D 33/35; B01D 35/00; B01D 35/16; B01D 39/1607; B01D 39/1653; B01D 39/20; B01D 46/0005; B01D 5/0057; B01D 53/0415; B01D 53/26; B01D 59/24; B01D 61/366; B01D 61/427; B01D 61/50; B01D 61/54; B01D 63/16; B01D 67/0004; B01D 67/0018; B01D 67/0079; B01D 67/00793; B01D 69/04; B01D 69/1071; B01D 69/1213; B01D 71/028; B01D 71/06; B01D 71/20; B01D 71/28; B01D 71/38; B01D 9/02

See application file for complete search history.

(56) References Cited

U.S. PATENT DOCUMENTS

| 5,667,676 | A | * | 9/1997 | Alaska | B01D 15/206 210/656 |
|---|---|---|---|---|---|
| 6,139,732 | A | * | 10/2000 | Pelletier | G01N 30/6021 210/656 |
| 9,778,232 | B2 | * | 10/2017 | Yotani | G01N 30/6047 |
| 2021/0178296 | A1 | | 6/2021 | Nakayama et al. | |

FOREIGN PATENT DOCUMENTS

| JP | 2015014477 A | * | 1/2015 | |
| JP | 2015114293 A | * | 6/2015 | |
| JP | 2016090336 A | * | 5/2016 | |
| JP | 2021-096137 A | | 6/2021 | |
| JP | 6991640 B2 | * | 1/2022 | B01D 15/1871 |
| KR | 101759123 B1 | * | 7/2017 | B01D 15/163 |
| WO | WO-2006111397 A1 | * | 10/2006 | G01N 30/603 |

* cited by examiner

LIQUID CHROMATOGRAPHY COLUMN WITH IMPROVED CONNECTION PERFORMANCE

CROSS-REFERENCE TO RELATED APPLICATION

This application claims priority under 35 USC 119 from Japanese Patent Application No. 2022-120884, filed on Jul. 28, 2022, the disclosure of which is incorporated by reference herein.

BACKGROUND

Technical Field

The present disclosure relates to a liquid chromatography column.

Related Art

A column disclosed in Japanese Patent Application Laid-Open (JP-A) No. 2021-96137 has caps mounted by fastening to respective ends of a column tube.

In the column described in JP-A No. 2021-96137, there is a possibility that, after filling the column tube with filler, excess filler might overflow when the caps are being fastened, which might become entrapped between the caps and the column tube.

When the filler becomes entrapped between the caps and the end portions of the column tube, gaps can easily form due to the entrapped filler at the end portions of the column tube, with the possibility that this leads to deterioration of the close connection performance and pressure endurance of the column as a whole. Moreover, to eliminate gaps at the end portions of the column tube and to ensure that the column as a whole has sufficient pressure endurance, caps are often tightened onto the column tube with a high tightening force. In such cases, there is a possibility that this might lead to damage to constituent components.

SUMMARY

An exemplary embodiment of the present disclosure provides a liquid chromatography column capable of achieving close connection performance and capable of securing sufficient pressure endurance by simply tightening caps onto a column tube, without filler becoming entrapped between the caps and the end portions of the column tube.

A liquid chromatography column of an embodiment of the present disclosure includes a column tube including a flow path that runs therethrough in an axial direction of the column tube and that is filled with a filler; a filter unit that is mounted at an axial direction end of the column tube to trap the filler inside the flow path; and a cap that includes a through hole communicated with the flow path through the filter unit and that is mounted at the column tube, wherein a gap, which is a space into which the filler overflowing from the flow path can escape when the cap is being attached to the column tube, is formed at an outer side of a contact surface at which the column tube and the filter unit contact each other.

The liquid chromatography column of the present disclosure enables close connection performance to be realized and enables pressure endurance of a column to be secured by simply tightening a cap onto a column tube, without filler becoming entrapped between the cap and an end portion of the column tube.

BRIEF DESCRIPTION OF THE DRAWINGS

Exemplary embodiments will be described in detail based on the following figures, wherein.

DETAILED DESCRIPTION

Figure 1:
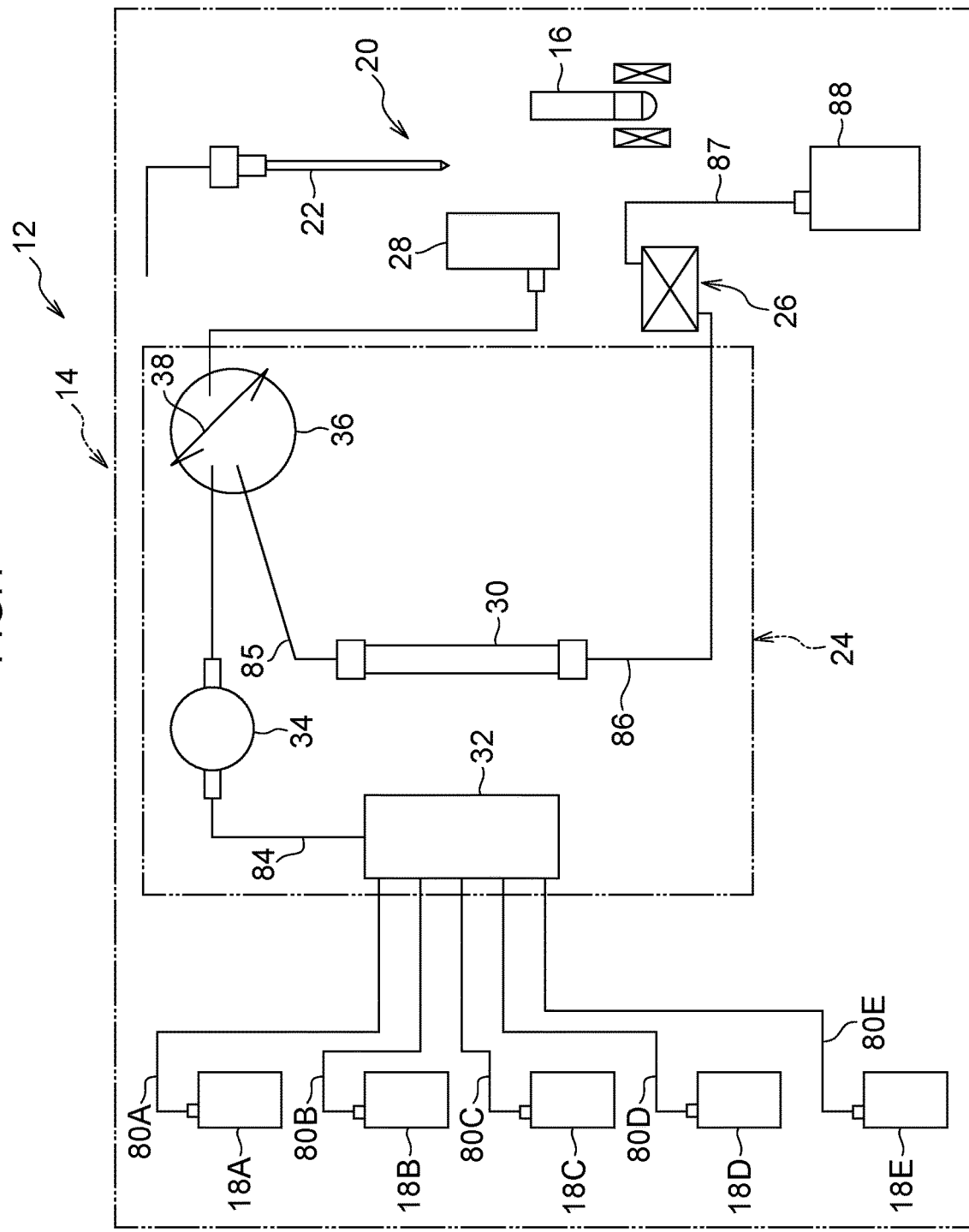
FIG. 1 is a configuration diagram to explain a liquid chromatography device equipped with a liquid chromatography column according to a first exemplary embodiment.

Explanation follows about an example of an exemplary embodiment of the present disclosure, with reference to the drawings. Note that the same reference numerals will be appended in the drawings to configuration elements and components that are either the same or equivalent. The dimensional ratios in the drawings are also exaggerated for ease of explanation and may differ from actual ratios.

First Exemplary Embodiment

Explanation follows about a liquid chromatography column 30 of a first exemplary embodiment, with reference to the drawings. Although the following description is of an example of an embodiment in which a concentration of glycohemoglobin (HbA1c) in whole blood is measured using a liquid chromatography device 12 equipped with the liquid chromatography column 30, the measurement target is not limited thereto.

Overall Configuration

As illustrated in FIG. 1, the liquid chromatography device 12 is able to measure the concentration of glycohemoglobin (HbA1c) in whole blood automatically by a blood collection tube 16 is setting in a device body 14 of the liquid chromatography device 12.

The device body 14 of the liquid chromatography device 12 includes plural (five in the example illustrated in FIG. 1) eluent bottles 18A, 18B, 18C, 18D, 18E. Each of the eluent bottles 18A to 18E holds an eluent to be supplied to the liquid chromatography column 30, which is described later. These eluents may have, for example, different constituents, component ratios, pH, osmotic pressures, and the like according to application.

The device body 14 further includes a sample preparation unit 20, an analysis unit 24, and a photometry unit 26.

The blood collection tube 16 is held in the device body 14 so as to be able to move to a position enabling collection sample using a nozzle 22 of the sample preparation unit 20.

The sample preparation unit 20 includes the nozzle 22 and a dilution chamber 28. The sample preparation unit 20 collects the blood sample from the blood collection tube 16 using the nozzle 22 and introduces the blood sample to the dilution chamber 28. The blood sample diluted in the dilution chamber 28 is introduced to the liquid chromatography column 30.

The nozzle 22 is able to aspirate and eject liquids. The nozzle 22 is able to collect various liquids including blood samples in the blood collection tube 16 by aspiration, and is able to eject the various liquids.

The analysis unit 24 includes the liquid chromatography column 30, a manifold 32, a liquid pump 34, and an injection valve 36.

The analysis unit 24 controls adsorption and desorption of biogenic substance to and from a filler G (see FIG. 4B) of the liquid chromatography column 30. The analysis unit 24 supplies various biogenic substances that have been separated in the liquid chromatography column 30 to the photometry unit 26. The setting temperature of the analysis unit 24 is, for example, 40° C.

The manifold 32 is connected to each of the eluent bottles 18A to 18E through respective tubes 80A to 80E and is connected to the injection valve 36 through the liquid pump 34 via a tube 84. The manifold 32 selectively supplies an eluent from a designated eluent bottle from out of the plural eluent bottles 18A to 18E to the liquid chromatography column 30 by switching inbuilt valves of the manifold 32.

The liquid pump 34 is provided partway along the tube 84 and imparts motive force to move the eluent to the injection valve 36.

The injection valve 36 includes plural introduction ports and exhaust ports (omitted in the drawings) and is able to collect a given quantity of blood sample and introduce this blood sample to the liquid chromatography column 30.

An injection loop 38 is connected to the injection valve 36. The injection loop 38 is able to hold a given quantity (for example several μL) of liquid. Appropriately switching the injection valve 36 enables selection of a state in which the injection loop 38 is in communication with the dilution chamber 28 and a blood sample is supplied from the dilution chamber 28 to the injection loop 38, or a state in which the injection loop 38 is in communication with the liquid chromatography column 30 via a tube 85, and a blood sample is introduced to the liquid chromatography column 30 from the injection loop 38. A six-way valve may, for example, be employed as such an injection valve 36.

The photometry unit 26 is connected to a waste liquid chamber 88 via a tube 87, and liquid exhausted from the liquid chromatography column 30 is discharged therein. The photometry unit 26 performs optical detection of hemoglobin contained in liquid passing through the liquid chromatography column 30.

Note that in the following description liquid introduced to the liquid chromatography column 30, as well as liquid exhausted therefrom, will both be referred to as "sample fluid". Namely, sample fluid is a fluid that includes a blood sample or eluent, or both.

Liquid Chromatography Column 30

Figure 2:
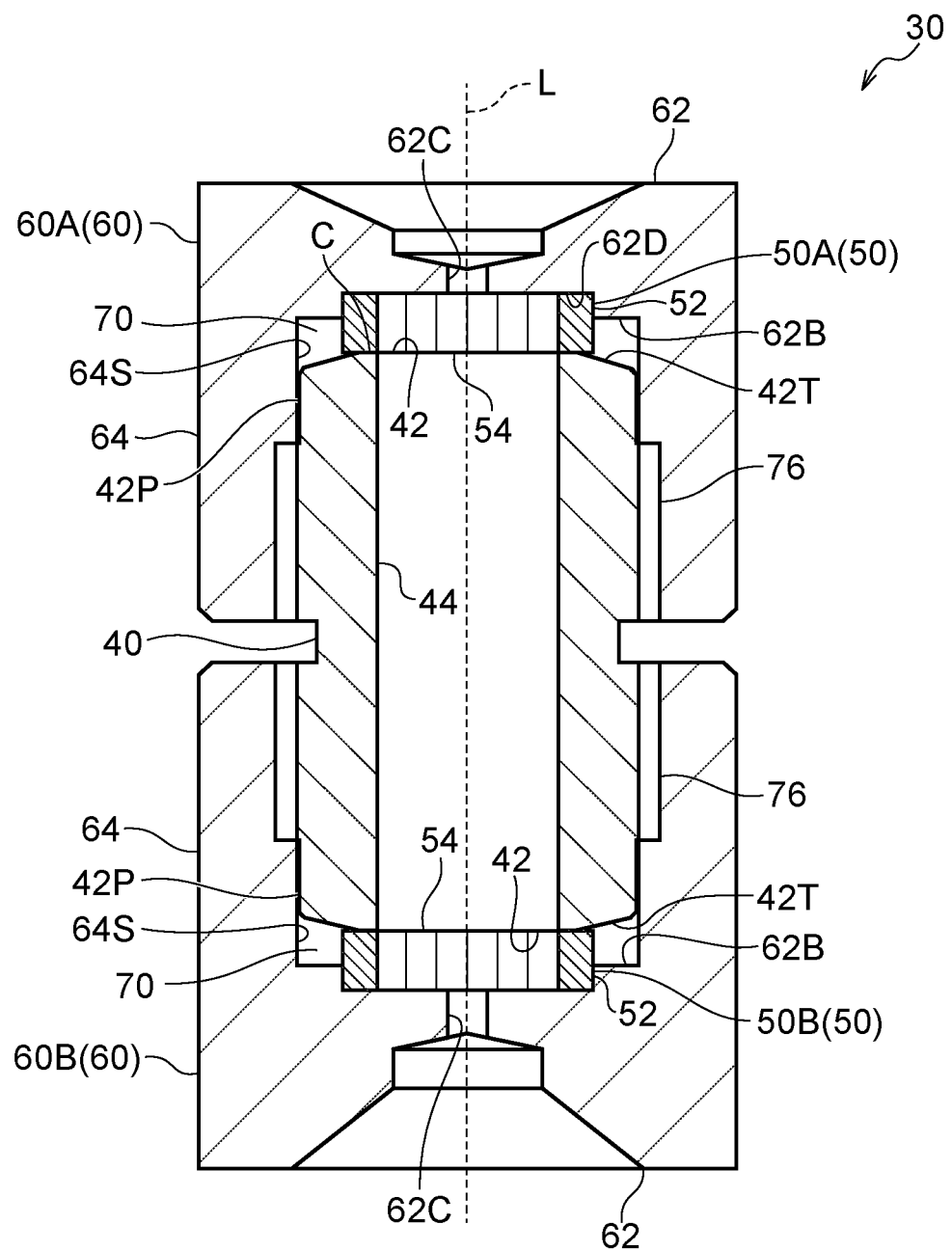
FIG. 2 is a cross-section to explain a liquid chromatography column according to the first exemplary embodiment.
Figure 3:
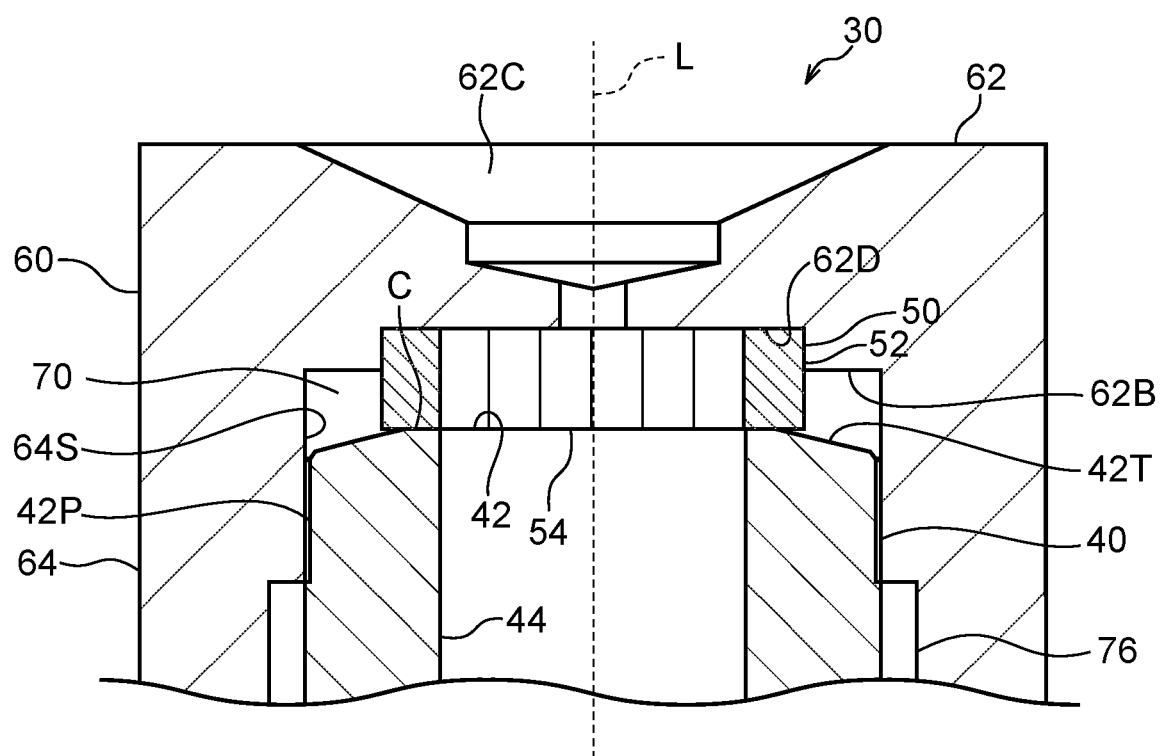
FIG. 3 is an enlarged cross-section to explain a liquid chromatography column according to the first exemplary embodiment.

As illustrated in FIG. 2 and FIG. 3, the liquid chromatography column 30 according to the present exemplary embodiment includes a column tube 40, two filter units 50, and two caps 60. The two filter units 50 are a first filter unit 50A and a second filter unit 50B respectively provided at an upstream side and a downstream side of the column tube. The two caps 60 are a first cap 60A and a second cap 60B respectively provided at an upstream side and a downstream side of the column tube. Note that in the following description reference will be made to a filter unit 50 when not particularly discriminating between the first filter unit 50A and the second filter unit 50B, and reference will be made to a cap 60 when not particularly discriminating between the first cap 60A and the second cap 60B.

As illustrated in FIG. 2 and FIG. 3, the column tube 40 is formed in a substantially cylindrical tube shape extending in an axial direction (length direction) of a center axis L. A flow path 44 having a prescribed internal diameter is formed inside the column tube 40 along the center axis L of the column tube 40. The filler G, which is described later, may be filled inside the flow path 44. The column tube 40 has a thickness in a radial direction (namely, in a direction orthogonal to the center axis L axial direction) of an amount that gives close contact with a retaining member 52 of the filter unit 50, as described later. The two axial direction ends of the center axis L of the column tube 40, namely the two end portions where the flow path 44 is open, are referred to as end faces 42. At least part of each of the end faces 42 is in close contact with the retaining member 52 of the filter unit 50. The portion of the end face 42 that is in close contact with the retaining member 52 is referred to as a contact surface C. The end face 42 and the contact surface C are both formed in ring shapes. In FIG. 2, the contact surface C is a portion at a radial direction inside (flow path 44 side) of the end face 42.

A column taper portion 42T that is a tapered face is formed to the end face 42 further to the radial direction outside (namely, on an outer peripheral face 42P side of the column tube) than the contact surface C that contacts the retaining member 52, which is described later. As illustrated in FIG. 3, a boundary between the column taper portion 42T and the contact surface C is at the radial direction inside of the outer peripheral face of the filter unit and is at the radial direction outside of an inner wall face of the flow path 44. The column taper portion 42T is inclined from this boundary toward the outside so as to separate from a bottom surface of the cap 60 as it nears the outer peripheral face 42P of the column tube 40. Namely, the column taper portion 42T faces the retaining member 52 of the filter unit 50, described later, but does not contact the retaining member 52.

Note that the shape and material of the column tube 40 may be set as appropriate. For example, the column tube 40 is formed from a hard resin material.

The first cap 60A and the second cap 60B are each formed in a bottomed circular cylinder shape including a side portion 64 and a bottom portion 62. As illustrated in FIG. 2, the center axis L of the first cap 60A and the second cap 60B are coaxial with the center axis L of the column tube. The first cap 60A is a member that is mounted at a center axis L axial direction end of the column tube 40 so as to sandwich the first filter unit 50A, which is described later, between the bottom portion 62 of the first cap 60A and the center axis L axial direction end of the column tube 40. The second cap 60B is a member that is mounted at a center axis L axial direction other end portion of the column tube 40 so as to sandwich the second filter unit 50B, which is described later, between the bottom surface 62B of the second cap 60B and the center axis L axial direction other end portion of the column tube 40. Although the first cap 60A and the second cap 60B have equivalent structures and shapes to each other in the present exemplary embodiment as illustrated in FIG. 2, the first cap 60A and the second cap 60B may have different structures from each other so as to be able to discriminate between upstream and downstream.

As illustrated in FIG. 2 and FIG. 3, the side portion 64 of the cap 60 has an internal diameter of an inside surface 64S that is substantially the same as the outer diameter of the outer peripheral face 42P of the column tube 40 (radial direction outside peripheral face) so as to be attachable to the column tube 40. In the present exemplary embodiment, as an example a male thread is formed to the outer peripheral face 42P of the column tube 40, and a female thread is formed to the inside surface 64S of the cap 60, with the cap 60 attached by screwing onto the column tube 40. Hereafter a portion where the column tube 40 and the cap 60 are joined in a state in which the cap 60 has been attached to the column tube 40 is referred to as join portion 76. The side portion 64 of the cap 60 is mounted at the outer peripheral face 42P of the column tube 40 such that the filter unit 50, which is described later, is in close contact with the end portion of the circular cylinder-shaped column tube. The degree of close connection between the cap 60 and column tube 40, when the cap 60 is being mounted, can be adjusted by adjusting the degree of screwing by the join portion 76.

As illustrated in FIG. 2 and FIG. 3, a through hole 62C and a recess 62D are formed to the bottom portion 62 of the cap 60.

The through hole 62C is a hole that pierces through the bottom portion 62 along the center axis L of the cap 60. The through hole 62C lets sample fluid, which is described later, pass through, is a path for the sample fluid to pass through to the flow path 44 via the filter unit 50, which is described later, and has a function to link to an external flow path where the sample fluid flows. Note that sometimes connection is made to the external flow path by a conventional screw fitting. Moreover, as an example in the present exemplary embodiment, the sample fluid is supplied through the through hole 62C of the first cap 60A and is exhausted from the through hole 62C of the second cap 60B. In order for the sample fluid to pass through freely, the through holes 62C extend along the direction of the center axis L of the column tube 40, and each have the same center axis L as that of the column tube 40. The liquid chromatography column 30 is accordingly formed in a substantially circular cylinder shape overall having a single center axis L.

As illustrated in FIG. 3, the recess 62D is a portion at the inner side of the bottom portion 62 indented in the center axis L axial direction so as to be separated from the column tube 40, and is a portion where the filter unit 50, which is described later, is fitted. The filter unit 50 can be retained more certainly by the cap due to the filter unit 50 being fitted to the indented recess 62D.

The filter unit 50 includes, as an example illustrated in FIG. 2, a porous body filter 54 and a retaining member 52 that retains the filter 54. The filter unit 50 is mounted at an end portion of the column tube 40. The filter 54 is held at a central portion of the retaining member 52. As illustrated in FIG. 2, the first filter unit 50A and the second filter unit 50B in the present exemplary embodiment are formed with substantially the same shape as each other.

Multiple pores having a prescribed pore size are formed in the filter 54, and the filter 54 is, for example, a membrane filter or a sintered filter that traps particles contained in the sample fluid. The filter 54 is formed in a short circular cylinder shape having a thickness along the center axis L axial direction.

Note that the diameter of the pores formed in the filter 54 is a size that allows the sample fluid to pass through but does not allow the filler G, which is described later, to pass through. In other words, the filter 54 is in communication with the through hole 62C, traps the filler G in the flow path 44 inside the flow path 44, and allows the sample fluid to pass through.

The retaining member 52 is formed in a substantially circular ring shape having an outer diameter substantially the same as the internal diameter of the recess 62D, and is a member mounted in the recess 62D while holding the filter 54 at a central portion (inside a circular ring). Moreover, as illustrated in FIG. 3, the retaining member 52 has a thickness in the radial direction of an amount that enables close contact with the end face 42 of the column tube 40 and has a height that is substantially the same as that of the filter 54 in the center axis L axial direction. The filter unit 50 is sandwiched between the end portion of the column tube 40 and the cap in a state in which the filter 54 is being retained by the retaining member 52.

Note that the center axis L axial direction thickness of the filter unit 50 is longer than a depth of the recess 62D (center axis L axial direction length), and in a state in which the filter unit 50 is mounted in the recess 62D as illustrated in FIG. 2 and FIG. 3, the filter unit 50 protrudes out from the bottom surface 62B toward the column tube 40 side. The bottom surface 62B does not contact the column tube 40 in the example of FIG. 2.

As illustrated in FIG. 2 and FIG. 3, the filter unit 50 and the column tube 40 are in close contact at the contact surface C in a state in which the cap 60 is attached to the column tube 40. In this state, sample fluid passing through the through hole 62C of the first cap 60A and supplied to the first filter unit 50A, passes through a first filter 54A and is introduced to the flow path 44 of the column tube 40. Moreover, at the center axis L axial direction opposite side of the column tube 40, the sample fluid passes from the flow path of the column tube 40 through a second filter 54B of the second filter unit 50B and is exhausted through the through hole 62C of the second cap 60B. The filter unit 50 and the column tube 40 are in close contact at the contact surface C by the cap 60 being tightened onto the column tube 40, and so neither filler nor sample fluid leaks from the contact surface C. The filler is trapped in the flow path 44 by the filter unit 50, but the sample fluid from the external flow path flows in sequence through the through hole 62C of the first cap 60A, the first filter 54A, the flow path 44 of the column, the second filter 54B, and the through hole 62C of the second cap 60B, and then outside.

In a state in which the cap 60 is attached to the column tube 40, a gap 70 is positioned outside the contact surface C as a space surrounded by the column tube 40 and the retaining member 52, and the inside surface 64S of the cap 60. In other words, the gap 70 in the present exemplary embodiment is a ring-shaped space surrounded by the column taper portion 42T, the retaining member 52 of the filter unit 50, the bottom surface 62B of the cap and the inside surface 64S of the cap 60. Operation of the gap 70 is described later.

The retaining member 52 and the cap 60 may be formed by any material, and are, for example, formed from a hard resin material that is not readily deformed. The column tube 40, the retaining member 52 of the filter unit 50, and the cap 60 may all be formed from the same hard resin material.

Note that the filters 54 respectively retained by the first filter unit 50A and the second filter unit 50B described above may be formed as the same type of component or may be formed as separate types of components having different pore sizes, thicknesses, and the like. Namely, the filters 54 respectively retained by the first filter unit 50A and the second filter unit 50B may be appropriately decided according to application conditions of the sample and eluent in the liquid chromatography device 12.

The first filter unit 50A and the second filter unit 50B may be formed as respective single bodies together with the first cap 60A or the second cap 60B or may be each be formed as separate bodies and then respectively joined thereto. The first filter unit 50A and the second filter unit 50B are able to be mounted at the column tube 40 at the same time as the first cap 60A and the second cap 60B, respectively.

Liquid Chromatography Column 30 Assembly

Figure 4A:
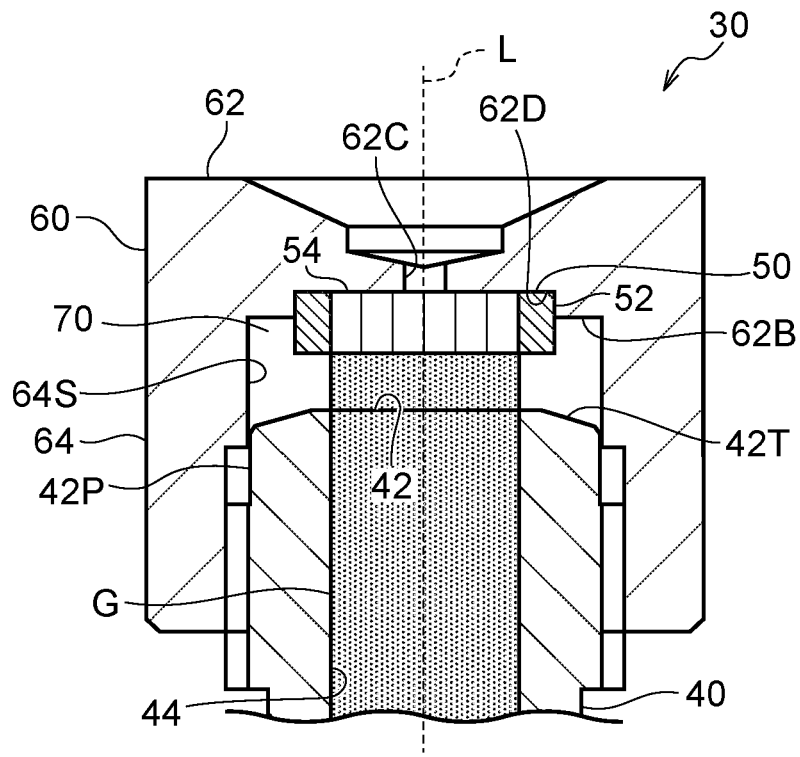
FIG. 4A is a cross-section illustrating how a liquid chromatography column according to the first exemplary embodiment is being assembled, and illustrating how a cap is being attached to a column tube.
Figure 4B:
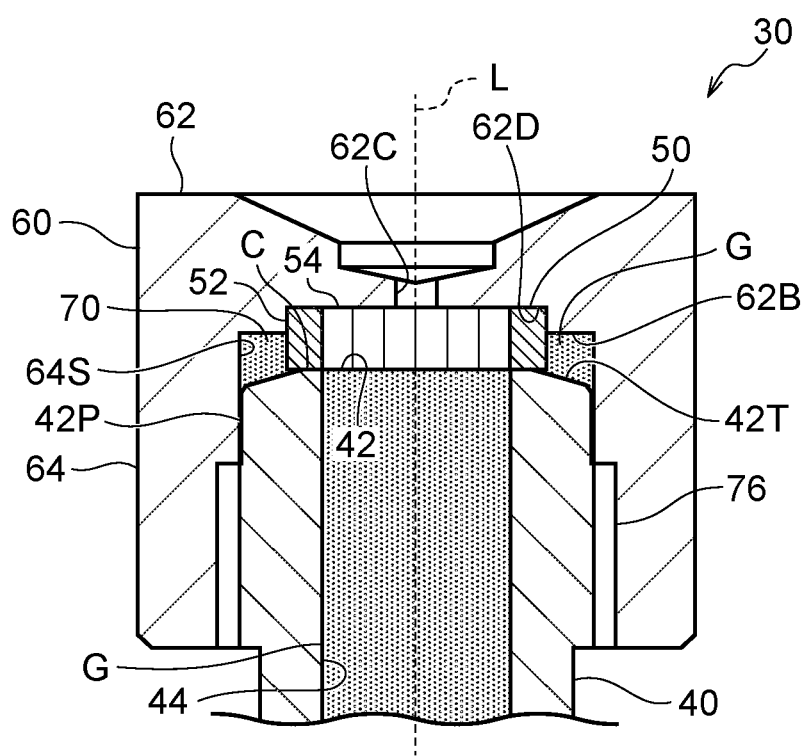
FIG. 4B is a cross-section illustrating how a liquid chromatography column according to the first exemplary embodiment is being assembled, and illustrating how a cap is being attached to a column tube and filler enters a gap.

Next, description follows regarding assembly of the liquid chromatography column 30 in the present exemplary embodiment, with reference to FIG. 4A and FIG. 4B. Note that in FIG. 4A and FIG. 4B the second cap 60B has already been attached to the column tube 40 at the opposite center axis L axial direction side to the illustrated end face 42 of the column tube 40, namely at the non-illustrated end face of the column tube 40. The filter unit 50 is fitted to the recess 62D of the cap 60. The filter unit 50 is sandwiched between the column tube 40 and the cap 60 by attaching the cap 60 to the column tube 40, with the filter unit 50 in close contact with the center axis L axial direction end face of the column tube 40.

After one of the caps 60 has been attached to the column tube 40, the filler G is introduced to the flow path 44 of the column tube 40, at an amount such that the filler G protrudes from the end face 42, before then attaching the other of the two caps 60 to the column tube 40. The filler G is a gel form substance for selective adsorption of hemoglobin variants in the sample and, for example, a methacrylic acid-methacrylic acid ester copolymer may be employed therefor.

FIG. 4A illustrates a state in which the cap 60 is being attached to the column tube 40. The filler G protrudes out further than the end face 42 under surface tension when the filler G overflows from the flow path 44 as illustrated in FIG. 4A. The filler G that overflows as the cap 60 is being attached is pressed by the filter unit 50, is fed toward the radial direction outside of the flow path 44 under pressure and enters the gap 70.

FIG. 4B illustrates a state in which the filler G overflowed from the flow path 44 has entered the gap 70 due to the cap 60 being attached to the column tube 40. The filling of the filler G is completed when attachment of the cap 60 is complete. In other words, the filler G overflowing from the flow path 44 escapes into the gap 70 when the cap 60 is being attached to the column tube 40.

The liquid chromatography column 30 having the flow path 44 completely filled with the filler G is assembled in such a procedure by the cap 60 being attached to the column tube 40 in the state in which the filler G has overflowed from the flow path 44 of the column tube 40.

Note that the volume of the gap 70 may be set as appropriate.

Operation and Advantageous Effects

Next explanation follows regarding the operation and advantageous effects of the present exemplary embodiment.

In the liquid chromatography device 12 illustrated in FIG. 1, the blood sample is collected from the blood collection tube 16 and supplied to the dilution chamber 28 using the nozzle 22. A diluent is furthermore supplied to the dilution chamber 28 from a preparation fluid tank (omitted in the drawings), to prepare the sample fluid in the dilution chamber 28.

The sample fluid prepared in the dilution chamber 28 is supplied to the injection loop 38 and held therein. The injection valve 36 is then switched, and the sample fluid held in the injection loop 38 is introduced to the liquid chromatography column 30. When the sample fluid is introduced to the liquid chromatography column 30, sA1c, HbA0, modified Hb, and the like are adsorbed to the filler G. The injection valve 36 is then appropriately switched again and eluents are supplied to the liquid chromatography column 30 in a predetermined control sequence.

The sample fluid containing various separated hemoglobin is exhausted from the liquid chromatography column 30. The sample fluid is supplied to a photometry cell of the photometry unit 26 through a tube 86, and then guided to the waste liquid chamber 88 through the tube 87.

In the photometry unit 26, light is continuously irradiated onto the sample fluid from a light source, and after transmitted light has been split by a beam splitter, is received by a light receiving element. A chromatogram is computed and acquired by a control section of the photometry unit 26 based on photoreception results of the light receiving element.

There is a demand for pressure endurance of the column to secure the performance of the column. The column tube 40 and the retaining member 52 are in close contact at the contact surface C in the liquid chromatography column 30 according to the present exemplary embodiment. Screwing the cap 60 on when attaching to the column tube 40 enables close connection performance to be secured at the contact surface C, and enables the sample fluid or the like that is in the flow path 44 inside the liquid chromatography column 30 to be prevented from leaking out from the contact surface C. The gap 70 is formed by the cap 60, the column tube 40, and the retaining member 52 at the radial direction outside with respect to the contact surface C in a state in which the cap 60 is attached to the column tube 40.

The filler G that has overflowed from the flow path 44 of the column tube 40 accordingly does not become entrapped at the contact surface C between the retaining member 52 and the end face 42 when the cap 60 is being attached, and instead escapes into the gap 70. This thereby enables close connection performance and pressure endurance of the column to be secured at the contact surface C simply by tightening the cap 60.

Moreover, the filter unit 50 of the liquid chromatography column 30 according to the present exemplary embodiment protrudes out toward the column tube 40 from the bottom surface 62B at the inner side of the cap 60, and so the filler G is readily pressed out and escapes easily from the contact surface C when the cap 60 is being attached. The end face of the filter 54 and the end face of the retaining member 52 are flush with each other in the radial direction. When the filler G that has overflowed from the flow path 44 is present, contact between the filler G and the filter 54 that is further toward the center than the retaining member 52 occurs before contact between the retaining member 52 and the end face of the flow path 44. This means that the filler G is even more readily pressed from the center side to the gap 70 present at the outside. Note that although in the present exemplary embodiment the cap 60 is attached to the outer peripheral face of the column tube 40 by screwing on the cap 60, other than screwing on, another mounting method such as fitting may be applied as appropriate.

Moreover, the column taper portion 42T, which is an outwardly inclined tapered face, is formed to the column tube 40 of the liquid chromatography column 30 according to the present exemplary embodiment. The column taper portion 42T is inclined so as to separate from the end face of the retaining member 52 in the center axis L axial direction on approach to the inside surface 64S of the cap 60. Namely, the filler G that has overflowed from the flow path 44 of the column tube 40 is readily guided to the gap 70 by the column taper portion 42T. This accordingly enables the filler G that has overflowed from the flow path 44 of the column tube 40 to be guided toward the gap 70 when the cap 60 is being attached to the column tube 40.

Moreover, the column taper portion 42T of the column tube 40 of the liquid chromatography column 30 according to the present exemplary embodiment may be inclined at an angle exceeding 0° and less than or equal to 30° with respect to the contact surface C. Examples thereof include, for example, 5°, 10°, 15°, 20°, 25°, 30°. In the present exemplary embodiment, the contact surface C and the column taper portion 42T are formed to the end face 42 at the end portion of the column tube 40.

Modified Example

Next, description follows regarding modified examples of the liquid chromatography column 30 according to the present exemplary embodiment. Note that in the following modified examples the same reference numerals to those of the first exemplary embodiment are appended to similar configuration to that of the first exemplary embodiment, and explanation thereof will be omitted.

First Modified Example

Figure 5:
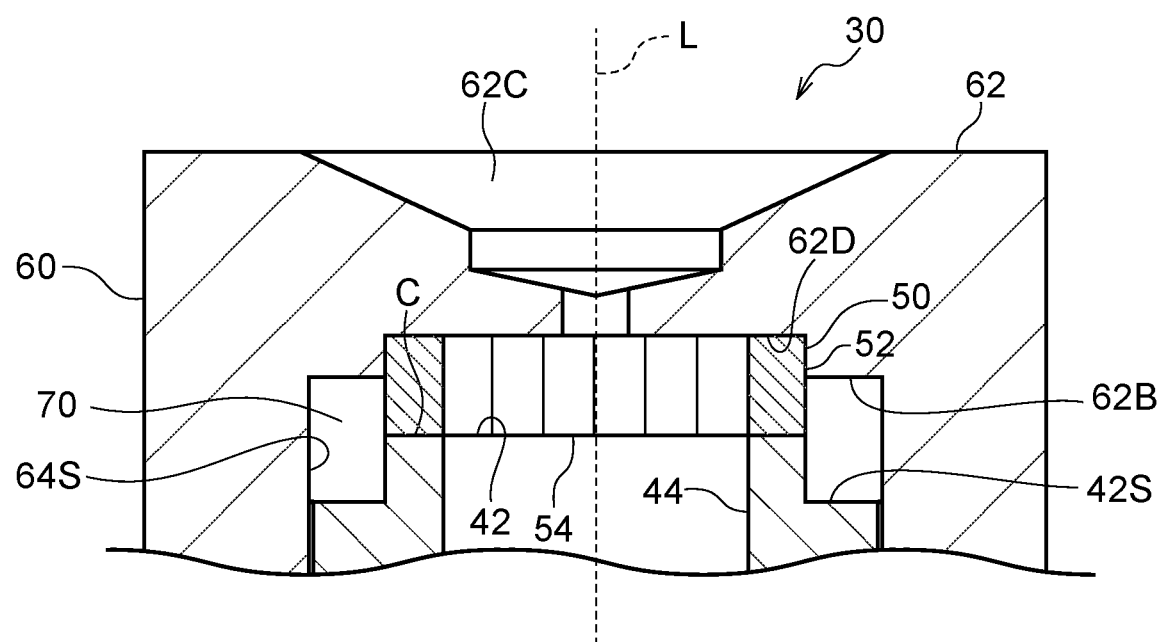
FIG. 5 is a cross-section illustrating a first modified example of a liquid chromatography column according to the first exemplary embodiment.

FIG. 5 is a diagram illustrating a first modified example of the liquid chromatography column 30 according to the first exemplary embodiment.

In the first modified example as illustrated in FIG. 5, a column step portion 42S is formed to the end portion of the column tube 40 instead of the column taper portion 42T, with the column step portion 42S being formed in a shape stepped toward the opposite side in the center axis L axial direction to the filter unit 50. In other words, the column step portion 42S may be thought of as being a portion of smaller outer diameter at the center axis L axial direction end of the column tube 40. Note that other configuration and shapes are similar to those of the first exemplary embodiment.

The gap 70 of the first modified example is provided at the outer side of the contact surface C as a space surrounded by the column tube 40 and the filter unit 50, and the inside surface 64S of the cap 60. In other words, the gap 70 of the present modified example is a space surrounded by the column step portion 42S, the filter unit 50, the bottom surface 62B of the cap 60, and the inside surface 64S of the cap 60.

Second Modified Example

Figure 6:
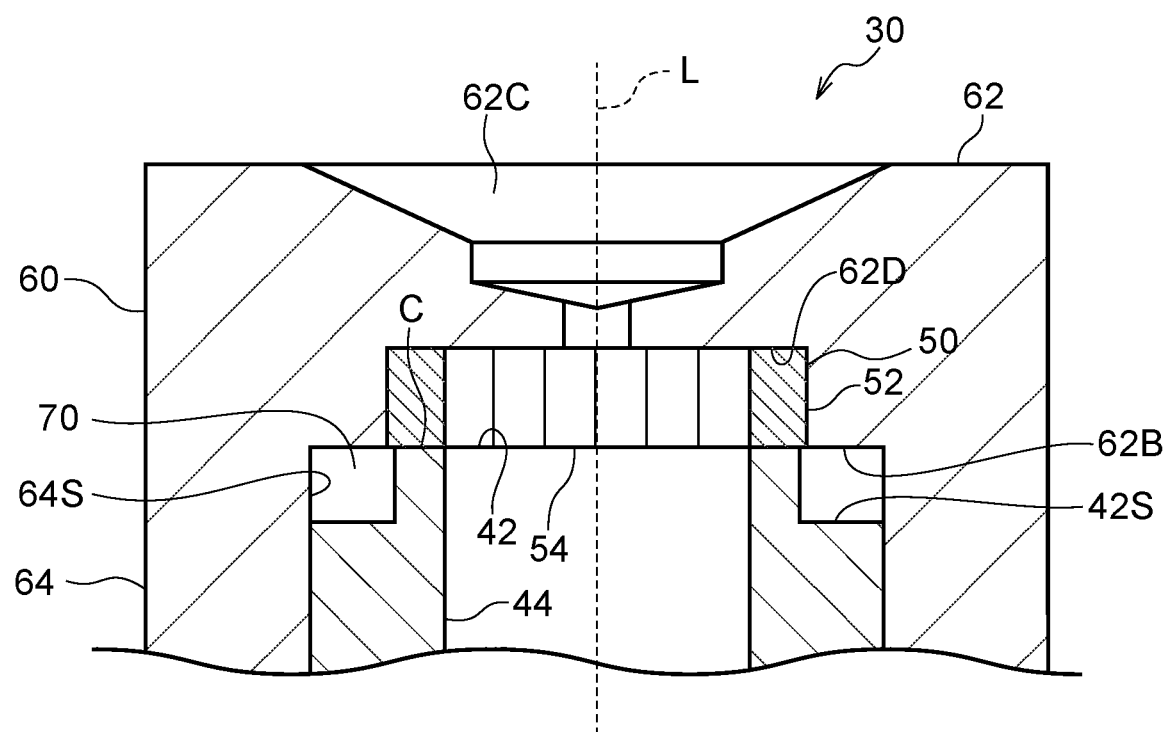
FIG. 6 is a cross-section illustrating a second modified example of a liquid chromatography column according to the first exemplary embodiment.

FIG. 6 is a diagram illustrating a second modified example of the liquid chromatography column 30 according to the first exemplary embodiment.

In the second modified example as illustrated in FIG. 6, a bottom portion 62B of the cap 60 is at the same position in the center axis L axial direction as the contact surface C of the filter unit 50. Moreover, a column step portion 42S is formed to an end portion of the column tube 40 similarly to in the first modified example. An outer diameter of the retaining member 52 in the filter unit 50 is formed larger than the outer diameter of the end face of the column tube 40. Namely, at the contacting faces of the retaining member 52 and the end face of the column tube 40, the face of the retaining member 52 where the column step portion 42S is not formed is formed larger than the face at the end face of the column tube 40. The larger formed face of the retaining member 52 is formed on the side where the column step portion 42S is not formed, and so this is thought to facilitate the filler being guided to the gap 70 by the column step portion 42S. Note that other configuration and shapes are similar to those of the first exemplary embodiment.

The gap 70 of the second modified example is positioned at the outer side of the contact surface C, and is space surrounded by the column tube 40 and the inside surface 64S of the cap 60. In other words, the gap 70 in the present modified example is a space surrounded by the column step portion 42S, the bottom portion 62B of the cap 60, and the inside surface 64S of the cap 60.

Third Modified Example

Figure 7:
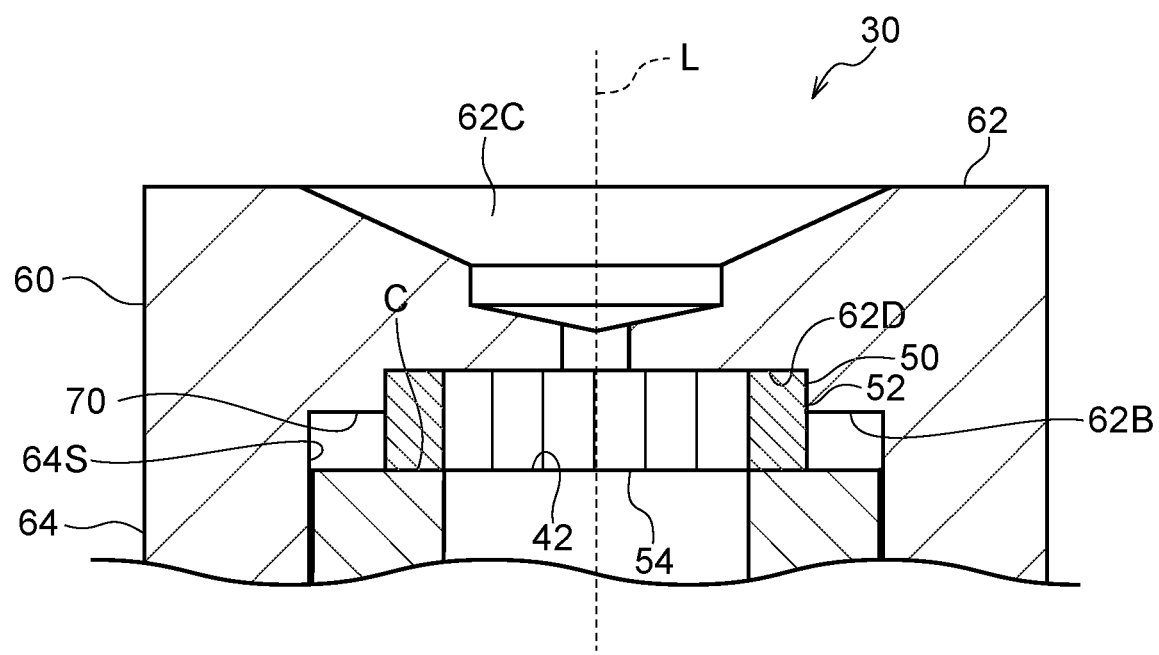
FIG. 7 is a cross-section illustrating a third modified example of a liquid chromatography column according to the first exemplary embodiment.

FIG. 7 is a diagram illustrating a third modified example of the liquid chromatography column 30 according to the first exemplary embodiment.

The third modified example as illustrated in FIG. 7 is not formed with a column taper portion 42T at the end portion of the column tube 40. Note that the other configuration and shapes are similar to those of the first exemplary embodiment.

The gap 70 of the third modified example is positioned outside the contact surface C as a space surrounded by the filter unit 50 and the inside surface 64S of the cap 60. In other words, the gap 70 of the present modified example is a space surrounded by the column tube 40, the filter unit 50, the bottom portion 62B of the cap 60, and the inside surface 64S of the cap 60.

Fourth Modified Example

Figure 8:
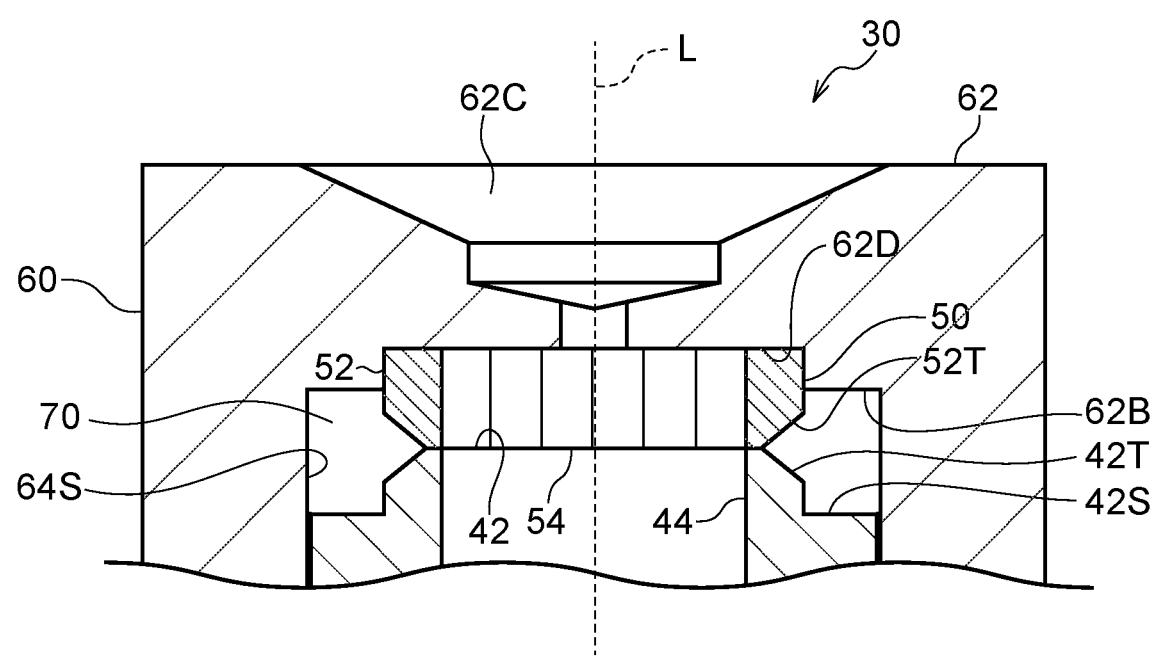
FIG. 8 is a cross-section illustrating a fourth modified example of a liquid chromatography column according to the first exemplary embodiment.

FIG. 8 is a diagram illustrating a fourth modified example of the liquid chromatography column 30 according to the first exemplary embodiment.

In the fourth modified example as illustrated in FIG. 8, a filter tapered portion 52T that is inclined toward the outside similarly to the column taper portion 42T is formed at a face of the filter unit 50 contacting the column tube 40. In the fourth modified example, the column taper portion 42T is formed at the end portion of the column tube 40 at the end portion of the column tube 40 at the radial direction inside thereof, and the column step portion 42S is formed at the radial direction outside thereof. Note that other configuration and shapes are similar to those of the first exemplary embodiment.

An angle formed between the filter tapered portion 52T and the contact surface C in the fourth modified example may, similarly to the column taper portion 42T, be an angle exceeding 0° and less than or equal to 30°.

The gap 70 of the fourth modified example is positioned at the outer side of the contact surface C as a space surrounded by the column tube 40 and the filter unit 50, and the inside surface 64S of the cap 60. In other words, the gap 70 of the present modified example is a space surrounded by the column taper portion 42T, the column step portion 42S, the filter tapered portion 52T, the bottom portion 62B of the cap 60, and the inside surface 64S of the cap 60.

In the present modified example, due to the filter tapered portion 52T being formed, the filler G overflowing from the flow path 44 can be moved even more readily into the gap 70 compared to in the liquid chromatography column 30 according to the first exemplary embodiment.

Moreover, in the present modified example, the surface area of the contact surface C between the column tube 40 and the filter unit 50 can be enlarged compared to cases in which the filter tapered portion 52T is inclined at an angle greater than 30° with respect to the contact surface C. This enables a possibility of the filler G filled in the flow path 44 leaking from the flow path 44 to be reduced when the liquid chromatography column 30 is in use.

Fifth Modified Example

Figure 9:
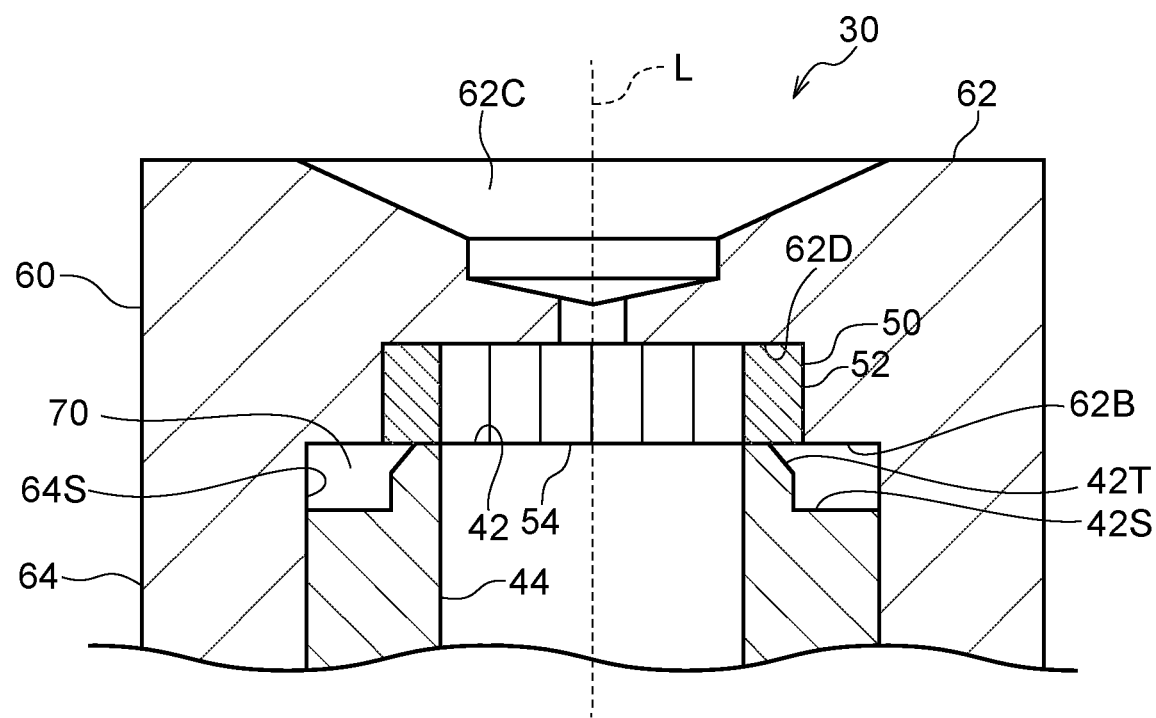
FIG. 9 is a cross-section illustrating a fifth modified example of a liquid chromatography column according to the first exemplary embodiment.

FIG. 9 is a diagram illustrating a fifth modified example of the liquid chromatography column 30 according to the first exemplary embodiment.

In the fifth modified example as illustrated in FIG. 9, the column taper portion 42T is formed at the radial direction inside the end portion of the column tube 40 similarly to in the fourth modified example, and the column step portion 42S is formed at the radial direction outside thereof. Moreover, in the fifth modified example, the bottom portion 62B of the cap 60 is at the same position in the center axis L axial direction as the contact surface C of the filter unit 50 similarly to the second modified example. Note that other configuration and shapes are similar to those of the first exemplary embodiment.

The gap 70 in the fifth modified example is positioned at the outer side of the contact surface C as a space surrounded by the column tube 40 and the inside surface 64S of the cap 60. In other words, the gap 70 of the present modified example is a space surrounded by the column taper portion 42T, the column step portion 42S, the bottom portion 62B of the cap 60, and the inside surface 64S of the cap 60.

Sixth Modified Example

Figure 10:
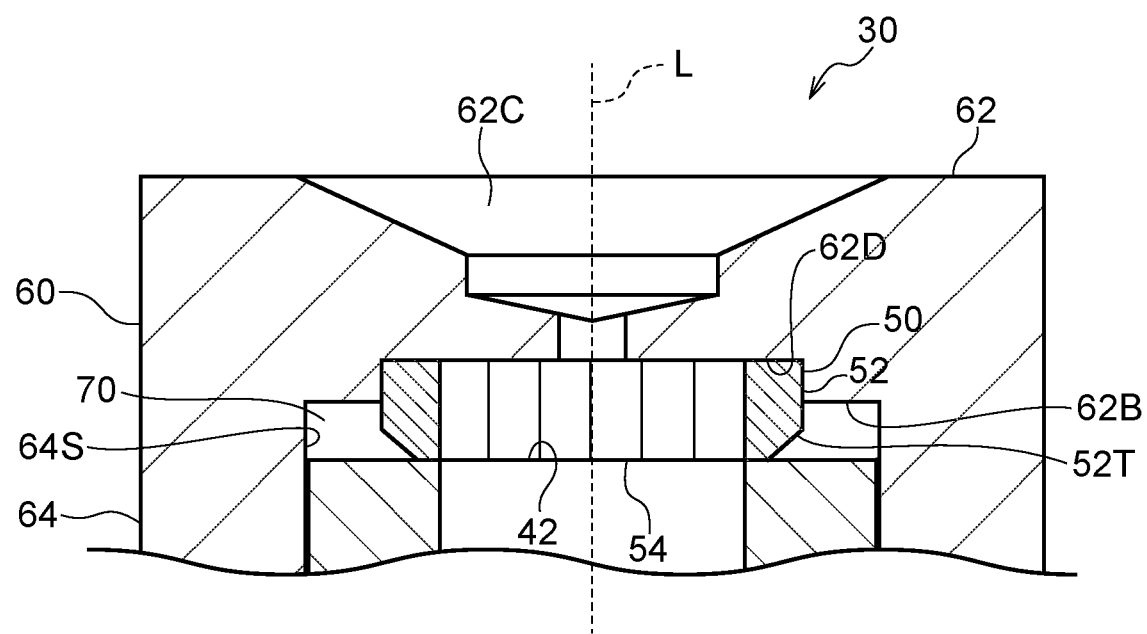
FIG. 10 is a cross-section illustrating a sixth modified example of a liquid chromatography column according to the first exemplary embodiment.

FIG. 10 is a diagram illustrating a sixth modified example of the liquid chromatography column 30 according to the first exemplary embodiment.

In the sixth modified example as illustrated in FIG. 10, a filter tapered portion 52T similar to that of the fourth modified example is formed to the filter unit 50. Moreover, the column tube 40 is not formed with a column taper portion 42T at the end portion of the column tube 40 similarly to in the third modified example. Note that other configuration and shapes are similar to those of the first exemplary embodiment.

The gap 70 of the sixth modified example is positioned at the outer side of the contact surface C as a space surrounded by the filter unit 50 and the inside surface 64S of the cap 60. In other words, the gap 70 of the present modified example is a space surrounded by the column tube 40, the filter tapered portion 52T, the bottom portion 62B of the cap 60, and the inside surface 64S of the cap 60.

Other Modified Examples

Note that although in the above description the liquid chromatography columns each include two caps, i.e., the first cap and the second cap, shaped so as to be symmetrical in the center axis L axial direction, there is no limitation thereto.

Second Exemplary Embodiment

Explanation follows regarding a second exemplary embodiment according to the present disclosure. Note that configuration in the second exemplary embodiment similar to that of the first exemplary embodiment is appended with the same reference numerals as those of the first exemplary embodiment, and explanation thereof will be omitted.

Figure 11:
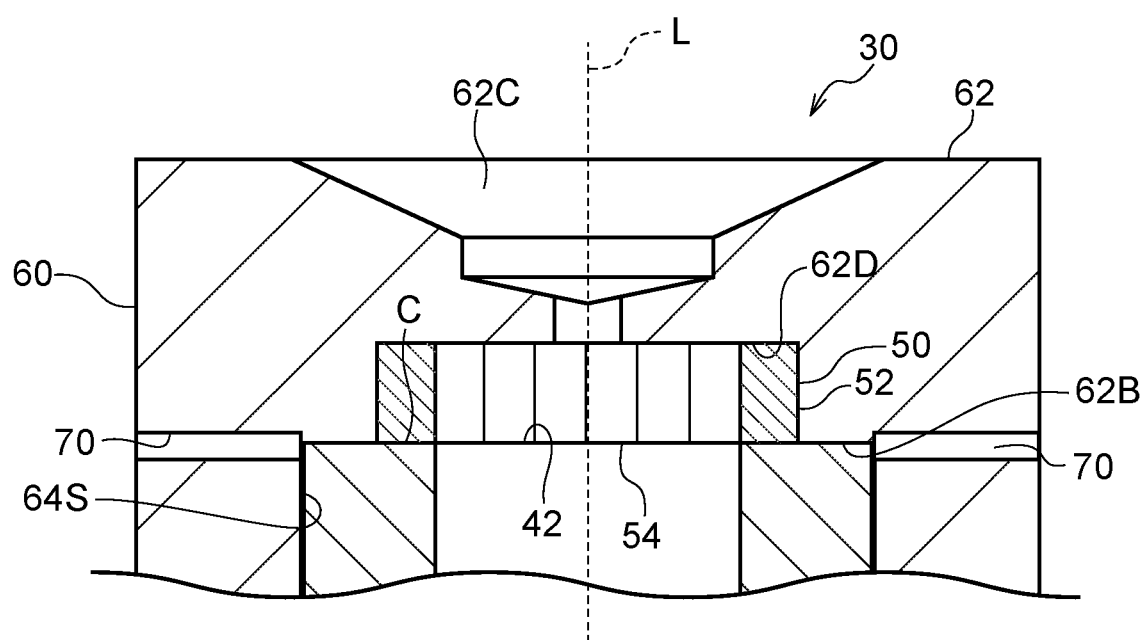
FIG. 11 is a cross-section illustrating a liquid chromatography column according to a second exemplary embodiment.

FIG. 11 is a diagram illustrating a second exemplary embodiment of the liquid chromatography column 30 according to the present disclosure.

As illustrated in FIG. 11, in the liquid chromatography column 30 according to the second exemplary embodiment, the bottom portion 62B of the cap 60 and the end face 42 of the column tube 40 contact each other. Moreover, in the liquid chromatography column 30 according to the second exemplary embodiment, the gap 70 that is in communication with the outer side of the cap 60 is formed at the same center axis L axial direction position as the contact surface C.

The gap 70 is, as an example, a hole in the radial direction of the contact surface C opening toward the outside from the inside surface 64S of the cap 60. Note that the gap 70 is, as an example, formed at plural locations (two in FIG. 11) around the circumferential direction.

The gaps 70 are spaces that enables the filler G to be exhausted from the contact surface C when the cap 60 is being attached.

Other configuration is similar to the liquid chromatography column 30 according to the first exemplary embodiment.

Note that for the gaps 70 of liquid chromatography column 30 according to the present exemplary embodiment, the gaps 70 may be closed off by seal members or the like after the cap 60 has been attached to prevent the filler G inside the gaps 70 from leaking out further. Moreover, the through holes 62C that are present in the two ends of the liquid chromatography column 30 may be sealed with a separate sealing member when shipping.

Operation and Advantageous Effects

In the liquid chromatography column 30 according to the present exemplary embodiment, similarly to in the liquid chromatography column 30 according to the first exemplary embodiment, the filler G that has overflowed from the flow path 44 moves toward the gaps 70 when the cap 60 is being attached to the column tube 40.

Moreover, in the liquid chromatography column 30 according to the present exemplary embodiment, the gaps 70 pass through to the outside of the cap 60, and so the filler G that has overflowed from the flow path 44 is exhausted outside through the gaps 70.

This thereby means that in the liquid chromatography column 30 according to the present exemplary embodiment too, the filler G that has overflowed from the flow path 44 of the column tube 40 does not become entrapped between the retaining member and the end face of the column tube 40 when the cap 60 is being attached, enabling the pressure endurance of the column to be secured by simple tightening the cap 60.

Note that the configuration of the liquid chromatography column 30 according to the first exemplary embodiment and the configuration of the modified examples according to the first exemplary embodiment, as well as appropriate combinations of such configuration, may also be adopted in the liquid chromatography column 30 according to the second exemplary embodiment too.

Although exemplary embodiments of the present disclosure have been described with reference to the appended drawings, it will be obvious to a person of ordinary skill in the art of the present disclosure that various modifications and application examples may be obtained therefrom within a range of the technology as recited in the scope of the patent claims, and these should also obviously be understood as belonging to the technology scope of the present disclosure.

INDUSTRIAL APPLICABILITY

Embodiments of the present disclosure may be utilized in liquid chromatography devices that secure pressure endurance of a column simply by tightening a cap onto a column tube without filler become entrapped between retaining member and the end face of the column tube.

What is claimed is:

1. A liquid chromatography column comprising:
   a column tube including a flow path that runs therethrough in an axial direction of the column tube and that is filled with a filler;
   a filter unit that is mounted at an axial direction end of the column tube to trap the filler inside the flow path; and
   a cap that includes a through hole communicated with the flow path through the filter unit and that is mounted at the column tube,
   wherein a gap, which is a space surrounded by the column tube, the filter unit, a bottom surface of the cap, and an inner surface of the cap, is formed at an outer side of a contact surface at which the column tube and the filter unit contact each other.

2. The liquid chromatography column of claim 1, wherein, in a state in which the cap has been attached to the column tube, the gap is formed between the inside surface of the cap and at least one of the column tube or the filter unit.

3. The liquid chromatography column of claim 2, wherein the filter unit is provided on the bottom surface in an inner side of the cap so as to protrude from the bottom surface inside the cap toward the column tube.

4. The liquid chromatography column of claim 2, wherein a tapered portion is formed in at least one of the column tube or the filter unit so as to be inclined from the contact surface toward an inside surface of the cap.

5. The liquid chromatography column of claim 4, wherein an angle formed between the tapered portion and the contact surface is more than 0° and 30° or less.

* * * * *